US007434551B2

(12) United States Patent
Zajac et al.

(10) Patent No.: US 7,434,551 B2
(45) Date of Patent: *Oct. 14, 2008

(54) CONSTANT TEMPERATURE INTERNAL COMBUSTION ENGINE AND METHOD

(75) Inventors: John Zajac, San Jose, CA (US); James Peter Chand, San Jose, CA (US)

(73) Assignee: Zajac Optimum Output Motors, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/771,823

(22) Filed: Jun. 29, 2007

(65) Prior Publication Data

US 2007/0289562 A1 Dec. 20, 2007

Related U.S. Application Data

(63) Continuation-in-part of application No. 11/372,751, filed on Mar. 9, 2006.

(60) Provisional application No. 60/806,294, filed on Jun. 30, 2006.

(51) Int. Cl.
*F02B 25/00* (2006.01)
*F02C 5/00* (2006.01)
(52) U.S. Cl. .................... 123/70 R; 60/39.6
(58) Field of Classification Search ............ 60/39.6, 60/39.63; 123/68, 70 R, 71 R, 72
See application file for complete search history.

(56) References Cited

U.S. PATENT DOCUMENTS

| 125,166 A | 4/1872 | Brayton |
| 691,017 A | 1/1902 | Thomson |
| 708,236 A | 9/1902 | Leonard |
| 837,989 A | 12/1906 | Weidmann |

(Continued)

FOREIGN PATENT DOCUMENTS

| DE | 3242431 A1 | 5/1984 |
| WO | 8400997 A1 | 3/1984 |

OTHER PUBLICATIONS

Wikipedia Contributors, Brayton cycle, Publication Date: Unknown, http://en.wikipedia.org/w/index.php?title=Brayton_cycle&oldid=81660788, Wikipedia, The Free Encyclopedia.

*Primary Examiner*—Noah Kamen
(74) *Attorney, Agent, or Firm*—Edward S. Wright

(57) ABSTRACT

Internal combustion engine and method with compression and expansion chambers of variable volume, a combustion chamber, a variable intake valve for controlling air intake to the compression chamber, a variable outlet valve for controlling communication between the compression chamber and the combustion chamber, means for introducing fuel into the combustion chamber to form a mixture of fuel and air which burns and expands in the combustion chamber, a variable inlet valve for controlling communication between the combustion chamber and the expansion chamber, a variable exhaust valve for controlling exhaust flow from the expansion chamber, means for monitoring temperature and pressure conditions, and a computer responsive to the temperature and pressure conditions for controlling opening and closing of the valves and introduction of fuel into to the combustion chamber to optimize engine efficiency over a wide range of engine load conditions. In some disclosed embodiments, the relative volumes of the compression and expansion chambers and the timing of the valves are such that the pressure in the combustion chamber remains substantially constant throughout the operating cycle of the engine, and exhaust pressures are very close to atmospheric pressure regardless of the load on the engine. In others, the temperature within the combustion chamber is maintained at a substantially constant level throughout the operating range of the engine, and the power produced by the engine is determined by the amount of air passing through the engine. The engine runs so quietly and burns so cleanly that in some applications it may not require a muffler and/or a catalytic converter.

29 Claims, 10 Drawing Sheets

U.S. PATENT DOCUMENTS

| | | |
|---|---|---|
| 1,111,841 A | 9/1914 | Koenig |
| 1,265,092 A | 5/1918 | Koenig |
| 1,273,834 A | 7/1918 | Dumanois |
| 1,512,673 A | 10/1924 | Breguet |
| 1,534,951 A | 4/1925 | Hiemer |
| 1,559,300 A | 10/1925 | Barnard |
| 1,597,924 A | 8/1926 | Powell |
| 1,639,165 A | 8/1927 | Burtnett |
| 1,694,759 A | 12/1928 | Taub |
| 1,695,714 A | 12/1928 | McCollum |
| 1,746,728 A | 2/1930 | Ensign |
| 1,805,670 A | 5/1931 | Miller |
| 1,869,805 A | 8/1932 | Ensign |
| 2,627,162 A | 2/1953 | Nilsson |
| 2,782,596 A | 2/1957 | Lindhagen |
| 2,991,616 A | 7/1961 | Miller |
| 3,254,489 A | 6/1966 | Eickmann |
| 3,623,463 A | 11/1971 | DeVries |
| 3,625,189 A | 12/1971 | Myers et al. |
| 3,862,622 A | 1/1975 | Spinnett |
| 3,932,987 A | 1/1976 | Munzinger |
| 3,940,925 A | 3/1976 | Kelley |
| 3,989,011 A | 11/1976 | Takahashi |
| 4,040,400 A | 8/1977 | Kiener |
| 4,050,420 A | 9/1977 | Cataldo |
| 4,074,671 A | 2/1978 | Pennila |
| 4,094,284 A | 6/1978 | Gesell |
| 4,109,470 A | 8/1978 | Cassidy |
| 4,149,370 A | 4/1979 | Ayala Vargas |
| 4,200,149 A | 4/1980 | Pechner |
| 4,212,163 A | 7/1980 | Mikina |
| 4,231,222 A | 11/1980 | Fenton |
| 4,235,080 A | 11/1980 | Cassidy |
| 4,288,989 A | 9/1981 | Cassidy |
| 4,336,686 A | 6/1982 | Porter |
| 4,458,635 A | 7/1984 | Beasley |
| 4,506,634 A | 3/1985 | Kerrebrock |
| 4,553,385 A | 11/1985 | Lamont |
| 4,553,513 A | 11/1985 | Miles |
| 4,589,262 A | 5/1986 | Nagao |
| 4,657,009 A | 4/1987 | Zen |
| 4,663,938 A | 5/1987 | Colgate |
| 4,783,966 A | 11/1988 | Aldrich |
| 4,997,594 A | 3/1991 | Walsh |
| 5,103,645 A | 4/1992 | Haring |
| 5,199,262 A | 4/1993 | Bell |
| 5,228,415 A | 7/1993 | Williams |
| 5,263,456 A | 11/1993 | Owen-Evans |
| 5,305,608 A | 4/1994 | Loving |
| 5,309,718 A | 5/1994 | Loving |
| 5,333,458 A | 8/1994 | Loving |
| 5,357,923 A | 10/1994 | Osterburg |
| 5,410,998 A | 5/1995 | Paul |
| 5,443,053 A | 8/1995 | Johnson |
| 5,522,356 A | 6/1996 | Palmer |
| 5,709,188 A | 1/1998 | Al-Qutub |
| 5,785,015 A | 7/1998 | Philippe |
| 6,092,365 A | 7/2000 | Leidel |
| 6,305,159 B1 | 10/2001 | Nagel |
| 6,318,310 B1 | 11/2001 | Clarke |
| 6,336,317 B1 | 1/2002 | Holtzapple |
| 6,485,255 B1 | 11/2002 | Care |
| 6,543,225 B2 | 4/2003 | Scuderi |
| 6,578,538 B2 | 6/2003 | Trentham |
| 6,609,371 B2 | 8/2003 | Scuderi |
| 6,722,127 B2 | 4/2004 | Scuderi |
| 6,789,514 B2 | 9/2004 | Suh et al. |
| 6,880,502 B2 | 4/2005 | Scuderi |
| 7,270,110 B2 | 9/2007 | Keoppel |
| 7,271,110 B2 | 9/2007 | Lu et al. |
| 7,325,520 B2 | 2/2008 | Zajac et al. |
| 7,328,674 B2 | 2/2008 | Zajac et al. |
| 2006/0122762 A1 | 6/2006 | Perkins |

CONSTANT TEMPERATURE INTERNAL COMBUSTION ENGINE AND METHOD

RELATED APPLICATIONS

Continuation-in-part of Serial No. 11/372,751, Filed Mar. 9, 2006;

Provisional Application Ser. No. 60/806,294, filed Jun. 30, 2006, the priority of which is claimed.

BACKGROUND OF THE INVENTION

1. Field of Invention

This invention pertains generally to internal combustion engines and, more particularly, to an internal combustion engine and method capable of operating with high efficiency over a wide range of engine speeds and load conditions.

2. Related Art

Heretofore, engines have been designed for specific uses. Gasoline engines may, for example, be designed to maximize power or efficiency. Attempts to set the valving, stroke, and fuel delivery at targets that provide both power and efficiency are, by design, compromises of both. When different load conditions are factored in, the compromises may become even greater.

With today's engines, there is much concern about pollution and the high cost of fuel. To find a solution to these concerns, it is not only necessary to develop an engine that is non-polluting, but also one which is high in fuel efficiency. For fuel efficiency, it is desirable to provide an engine that is not only efficient at one particular load, but rather over a wide range of operating and load conditions.

OBJECTS AND SUMMARY OF THE INVENTION

It is in general an object of the invention to provide a new and improved internal combustion engine and method.

Another object of the invention is to provide an internal combustion engine and method of the above character which operate efficiently over a wide range of operating and load conditions.

The engine has compression and expansion chambers of variable volume and a combustion chamber between the compression and expansion chambers. A variable outlet valve controls communication between the compression chamber and the combustion chamber, and a variable inlet valve controls communication between the combustion chamber and the expansion chamber. A fuel injector or other fuel inlet introduces fuel into the combustion chamber to form a mixture of fuel and air which burns and expands to drive an output member in the expansion chamber. Intake and exhaust valves control the intake of air to the compression chamber and the discharge of exhaust from the expansion chamber, and in the disclosed embodiments, those valves are also variable.

The engine also has temperature and pressure sensors for monitoring temperature and pressure conditions in the compression, combustion and/or expansion chambers and a computer responsive to the temperature and pressure conditions for controlling the opening and closing of the valves and the introduction of fuel into to the combustion chamber to optimize engine efficiency over a wide range of engine load conditions.

In some embodiments, the temperature within the combustion chamber is maintained at a substantially constant level throughout the operating range of the engine, and the power produced by the engine is determined by the amount of air passing through the engine.

In others, the relative volumes of the compression and expansion chambers and the timing of the valves are such that the pressure in the combustion chamber remains substantially constant throughout the operating cycle of the engine, and the exhaust is discharged at or very close to atmospheric pressure regardless of the load on the engine. In those embodiments, adjustments for power level or load are made by increasing or decreasing the temperature of the burning gas in the combustion chamber.

In some disclosed embodiments, the compression and expansion chambers are cylinders with reciprocating pistons in them. The pistons are connected to a crankshaft for reciprocating movement between top and bottom dead center positions in the cylinders. The combustion chamber is a separate chamber in which the fuel is burned, and there is no burning of fuel either in the compression cylinder or in the expansion cylinder. Expansion of the hot gas from the combustion chamber drives the piston in the expansion cylinder and produces the reciprocating motion of the pistons.

The volumes of the compression and/or expansion cylinders with the pistons at top dead center are very small. In one embodiment, the valves are rotary valves that do not extend into the cylinders and can remain open without interfering with the pistons as they travel to their top dead center positions close to the head. In some embodiments, the piston travels to within less than 0.150 inch from the head of the cylinder, and in some the distance is less than 0.015 inch.

The opening of the intake valve is delayed until after the piston in the compression cylinder has passed top dead center to prevent compressed gas from being blown back out through the intake manifold, which would waste the work done in compressing the air and compromise the efficiency of the engine. The delay in opening the valve can range from about 2 degrees to 45 degrees of crankshaft rotation, depending upon the compression ratio of the engine and the amount of air to be taken in.

The engine can have a compression ratio in the range of about 6:1 to 24:1, and in some embodiments, greater efficiency is provided with a compression ratio in the range of about 10:1 to 18:1. In some embodiments, where the maximum burn temperature is held to less than about 1800° K. to prevent $NO_X$ from forming, greater efficiency is provided with a compression ratio in the range of about 10:1 to 16:1.

Unlike conventional reciprocating piston engines with combustion in the cylinders, the compression ratio is determined in part by when the outlet valve opens to release compressed air from the compression cylinder to the combustion chamber. That generally happens when the compression piston has completed about 90% to 95% of its upward travel, with the point of opening being higher at higher compression ratios. As a result, the minimum volume of the compression cylinder is not limited by the compression ratio, and the piston can travel to a higher point in the cylinder than pistons in engines where combustion occurs in the cylinders and the compression ratio is determined by the volume above the pistons at the top of their stroke.

The amount of air and fuel provided to the combustion chamber can be adjusted for different load conditions. The timing for the intake valve controls the amount of air taken into the engine, and the timing of the outlet valve assures that the compressed air is at the correct pressure when the air is pushed into the combustion chamber. The timing for the inlet valve and the exhaust valve can also be adjusted according to the load. In some embodiments, the same amount of air is pumped into the compression chamber at different loads, but the amount of fuel injected and the amount of gas admitted to the expansion chamber are reduced at lower loads. The inlet valve to the expansion chamber is allowed to remain open for a shorter period of time at lower loads, with the pressure in the expansion chamber reaching atmospheric pressure before the piston reaches bottom dead center. This results in below atmospheric pressure as the piston continues its downward cycle, but the opening of the exhaust valve is delayed past bottom dead center to allow this negative work to be recovered during the upward cycle of the piston. In this way, efficiency is maintained across a wide range of load conditions.

In some embodiments, compression release braking is provided using either or both the compression cylinder and expansion cylinder. In one embodiment, compressed air is allowed to escape from the compression cylinder into the intake manifold to provide compression release braking without requiring an external muffler. In another embodiment, compression release braking is provided using both the compression cylinder and expansion cylinder in a manner that allows air to be compressed in at least one cylinder on every revolution of the crankshaft.

In some embodiments, the combustion chamber allows fuel to be ignited and then diluted with additional air to produce a leaner fuel mixture and reduce the production of CO. The combustion chamber also provides a relatively long burn time to reduce the production of CO. In some embodiments, the temperature of the combustion chamber is between about 1400 and 1800° K., which is hot enough to ensure that all of the burn products are oxidized and cool enough to prevent the formation of $NO_X$. Consequently, the exhaust from the engine is essentially free of CO and $NO_X$. The long burn time is beneficial in preventing unburned hydrocarbons and soot from being discharged in the exhaust.

DETAILED DESCRIPTION

Figure 1:
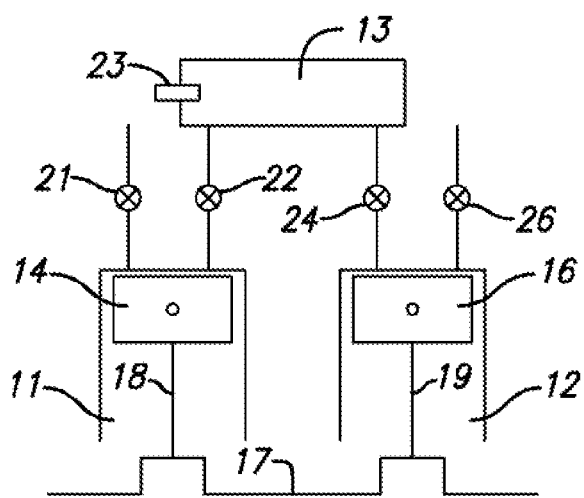
FIG. 1 is a simplified schematic diagram of one embodiment of an internal combustion engine incorporating the invention.

In the embodiment illustrated in FIG. 1, the engine has a compression cylinder 11 and an expansion cylinder 12 which communicate with opposite ends of a combustion chamber 13, with reciprocating pistons 14, 16 in the two cylinders forming chambers of variable volume. The pistons are connected to a crankshaft 17 by connecting rods 18, 19 for movement in concert between top dead center (TDC) and bottom dead center (BDC) positions in the cylinders, with each of the pistons making one upstroke and one downstroke during each revolution of the crankshaft. The terms upstroke and downstroke, as used herein, refer to the direction of piston movement toward the positions of minimum and maximum cylinder volume, not the physical directions in which the pistons travel.

Compression cylinder 11 receives fresh air through an intake valve 21 and communicates with the inlet end of combustion chamber 13 through an outlet valve 22. Fuel is injected into the combustion chamber through a fuel injector 23 or other suitable fuel inlet, where it is mixed with the air from the compression cylinder. The mixture burns and expands in the combustion chamber, and the expanding gas flows into the expansion cylinder from the outlet end of the combustion chamber through an inlet valve 24. Exhaust gas is discharged from the expansion cylinder through an exhaust valve 26.

A combustion chamber which is particularly suitable for use in this embodiment and others is described in detail in Ser. No. 11/372,737, filed Mar. 9, 2006, the disclosure of which is incorporated herein by reference. That chamber is elongated and, in some embodiments, folded back upon itself, with a rough, twisting interior side wall. The chamber is a double wall structure which, in one embodiment, has an outer wall of structurally strong material such as steel and/or a composite material and a liner of thermally insulative ceramic material, with long, sharp protrusions that extend inwardly from the side wall and form hot spots which help to provide complete combustion of the fuel mixture throughout the chamber.

The valves are rotary valves, electronic valves, or other suitable valves which permit a wide range of adjustment in the timing of the valves. A rotary valve system which is particularly suitable for use in this embodiment and others is disclosed in Ser. No. 11/372,978, filed Mar. 9, 2006, the disclosure of which is incorporated herein by reference. The opening or closing positions of the valves can be varied independently of each other, i.e., the opening positions can be adjusted without affecting the closing positions, or the closing positions can be adjusted without affecting the opening positions. In addition, the intake, outlet, inlet, and exhaust valves can all be adjusted independently of each other and while the engine is running. This full adjustability of the valve system permits continuous matching of engine performance with every combination of load and speed.

Unlike the poppet valves traditionally used in conventional Otto and Diesel engines, the valves employed in the invention do not protrude into the cylinders when they are open. Consequently, the engine can have nearly perfect volumetric efficiency, with the volume above the pistons being very close to zero both at the end of the compression stroke and at the beginning of the expansion stroke. Having the minimum volumes of the cylinders near zero allows for significant improvement in the efficiency of the engine.

With valves that do not protrude into the cylinders, the only limitation to full piston travel is the need for a small tolerance or clearance to prevent the pistons from striking the head due to thermal expansion or extension at higher engine speeds. This clearance can, for example, be on the order of about 0.010 inch to 0.200 inch, and typically does not need to be more than about 0.015 inch. Hence, the minimum volumes of the cylinders can be much closer to zero than they are in other engines.

Moreover, unlike conventional reciprocating piston engines where combustion takes place in the same cylinders as compression and expansion, the travel of the piston toward the top of the cylinder is not limited by the compression ratio. In a conventional engine, that ratio is determined by the ratio of the cylinder volume at bottom dead center (BDC) to the volume at top dead center (TDC), the need to keep the ratio below a certain level to avoid predetonation limits how close the pistons can come to the cylinder heads. In the engine of the invention, where the compression ratio is determined primarily by the timing of the valves and combustion occurs outside the compression cylinder, the compression ratio does not limit the travel of the pistons, and the compression piston can travel almost completely to the head because the outlet valve is opened to discharge the compressed air to the combustion chamber once the correct pressure has been achieved.

Although a rotary valve has the ability to open when the piston is at top dead center (TDC), that is generally not the most desirable way to operate the valves since it can result in compressed gases being blown out through the intake manifold. Opening the intake valve at top dead center would allow compressed air to escape, thereby wasting the work done in compressing it and compromising the efficiency of the engine.

Instead, it is preferable to retard the opening of the intake valve until the air in the cylinder has expanded enough to be at or near atmospheric pressure. In this way, the work done to compress the gas is recovered as the gas pushes against the piston during the initial portion of its downstroke.

For example, an engine with a 12.5:1 compression ratio and a 3.76 inch stroke may have a 0.015 inch clearance between the crown of the piston and the cylinder head. If the intake valve were opened at TDC, gas at a pressure of 504 PSI would escape and be wasted. If, however, the opening of the intake valve is delayed until the piston has moved down to the point where the gas has expanded to 12.5 times the volume at TDC, then the pressure of the gas above the piston would be at or near atmospheric, no gas would be lost out the intake valve, and the engine would still have the same amount of air in the cylinder at BDC even with the delayed opening of the intake valve.

In the foregoing example, the volume of the gas has expanded to 12.5 times the TDC volume when the piston has traveled 11.5×0.015 inch, or 0.173 inch, which is 4.6 percent of the 3.76 inch stroke and corresponds to 21.5 degrees of crankshaft rotation. With this delayed opening, the slotted openings in the intake valves can be substantially narrower, with the leading edges of the openings being moved back. In other embodiments, the intake valve may open when the compression piston has traveled past top dead center by a distance on the order of about 2 degrees to 45 degrees of crankshaft rotation.

The engine runs because the product of the volume and the pressure of the gas sent to the expansion cylinder is greater than the product of the pressure and the volume of the air delivered to the combustion chamber from the compression cylinder. Ignoring losses, the gas entering the expansion cylinder is at the same pressure as the air leaving the compression cylinder, but at a greater volume by an amount proportional to the rise in temperature in the combustion chamber. That rise is proportional to the amount of fuel injected into the combustion chamber.

The burning of fuel in the engine can easily result in a volumetric expansion of 2:1, which suggests that the expansion cylinders should have twice the volume of the compression cylinders. This can be accomplished by using a greater bore and/or stroke in the expansions cylinders, by using a greater number of expansion cylinders or by a combination thereof. While that would work well at full load, it would not be as efficient when the engine is operating at less than full load. Efficiency would be compromised most of the time since engines are rarely operated at 100% of their maximum load capability. In the invention, the sizes of the two pistons can be made equal, as can their strokes, which maintains good mechanical balance, and the amount of air intake can be varied to match the specific needs of the engine under different operating conditions. Thus, for example, with the conditions stated above (equal numbers of compression and expansion cylinders, pistons of equal size and stroke, and a maximum expansion ratio of 2:1 at full load), the air intake to the compressor is limited to about 50%. If the expansion ratio at full load is other than 2:1, then the amount of air intake can be adjusted accordingly, e.g. 40% for a ratio of 2.5:1. With lesser loads and lower power output, less air can be compressed, and less air requires less fuel to produce the same percent of expansion. Less air and less fuel produce less net power for smaller loads. Since the engine recaptures compressed air and work done against atmospheric pressure, there is no decrease in efficiency at partial loads.

The engine is not, however, limited to having equal numbers of compression and expansion cylinders and pistons of equal size and stroke. It can have any combination of cylinders and piston sizes and strokes desired and, by adjustment of the air intake and other valves, still maintain optimum efficiency throughout its operating range. The engine can also have more than one combustion chamber between the compression and expansion cylinders, if desired.

The engine can have virtually any compression ratio because, unlike an Otto cycle engine, there is no fuel to predetonate in the cylinder doing the compression, which would limit the compression ratio to about 10:1, and unlike a typical Diesel engine, the compression ratio does not have to be higher than about 18:1 in order to generate enough heat to ensure detonation. The engine can operate with a compression ratio anywhere in the range of about 6:1 to 24:1, but has the greatest efficiently with a ratio of about 10:1 to 18:1, although to prevent $NO_X$ from forming, the maximum temperature should be held to about 1700° K.-1800° K. Under those conditions, the engine produces maximum fuel efficiency with a compression ratio in the range of about 9:1 to 14:1. The engine can also operate at other compression ratios, but possibly not as efficiently. In areas where $NO_X$ pollution standards are not as stringent, the efficiency of the engine can be increased by the use of a higher compression ratio.

The compression ratio is controlled by the timing of the intake, outlet and inlet valves. In typical operation, the outlet valve opens when the pressure above the piston in the compression cylinder equals the pressure in the combustion chamber. In an engine having a 9:1 compression ratio in which the compression cylinder is allowed to have a full charge of air, the outlet valve opens when the piston has completed slightly more than 90% of its upward travel toward top dead center. For other compression ratios on the order of 10:1 to 18:1, the outlet valve is opened when the compression piston has completed about 90% to 95% of its upward travel, with the point of opening being higher at higher compression ratios. If the compression cylinder is not allowed to have a full charge of air, then the pressure within the cylinder will rise more slowly, and the outlet valve will open later in the upward stroke. Regardless of when the outlet valve is opened, it closes at or near top dead center for maximum efficiency.

The operating cycle of the engine is illustrated in FIGS. 2A-2E. In this particular embodiment, expansion piston 16 leads compression piston 14 by a few degrees, and the opening of inlet valve 24 is timed to coordinate with the opening of outlet valve 22, which maintains a substantially constant pressure in combustion chamber 13. That pressure is typically on the order of 200 to 1000 PSI and is dependent upon the compression ratio. Thus, it might, for example, be on the order of 270, 370 and 840 PSI for compression ratios of 8:1, 10:1 and 18:1, respectively.

If desired, for maximum engine balance, the two pistons can be timed to be precisely in phase and to reach top dead center at the same time. That will require the inlet and outlet valves to open at slightly different times, which will cause some pressure pulsing. However, the pressure pulses are relatively small due to the relatively large volume of the combustion chamber compared to the volume of air being provided by the compression chamber. Hence, the pulsing will not appreciably affect the efficiency of the engine.

The amount of lead between the expansion and compression pistons depends upon the compression ratio of the engine. With a compression ratio of 12.5:1, for example, the expansion piston leads by approximately 15 degrees of crankshaft rotation. With lower compression ratios, the lead time is greater, and for higher compression ratios, it is less.

Figure 2A:
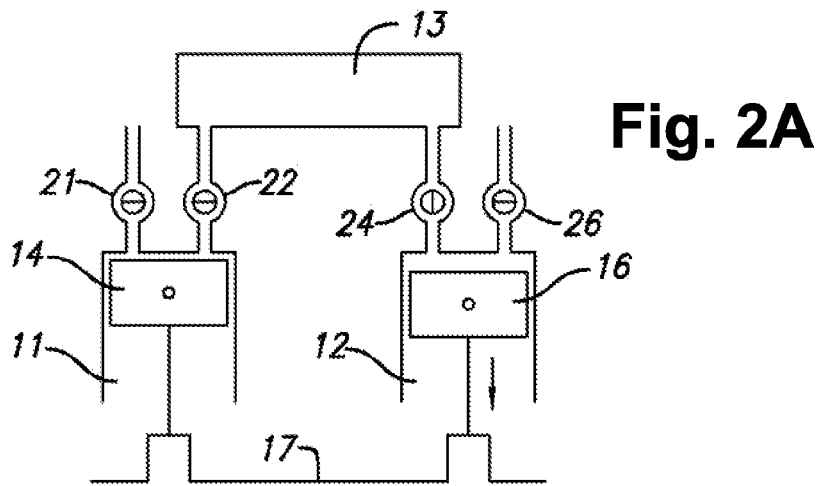
FIGS. 2A-2E are diagrammatic views illustrating the operation of the embodiment of FIG. 1.
Figure 2B:
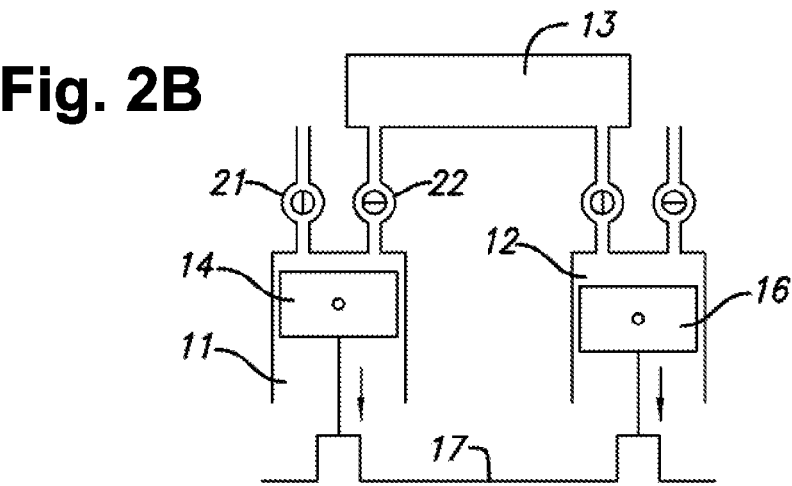

As illustrated in FIG. 2A, at the start of the operating cycle, compression piston 14 is at top dead center, expansion piston 16 is 15 degrees past top dead center, and the compression cylinder valves are closed. As the compression piston begins its downward stroke, intake valve 21 opens as shown in FIG. 2B, and air is drawn into the compression cylinder. Under normal operating conditions, the engine operates most efficiently when the intake valve is open for an amount of time such that after the volumetric expansion produced by the burning of the fuel in the combustion chamber and the decrease in pressure due to expansion of the gas in the expansion cylinder, the final pressure at the end of expansion will be close to atmospheric pressure. Keeping the exhaust pressure close to atmospheric pressure reduces the amount of energy wasted and provides for maximum efficiency. The exhaust valve is typically opened when the pressure is between atmospheric pressure and about 20% above atmospheric pressure, and in one presently preferred embodiment, it is opened when the pressure is about 2 PSI above atmospheric pressure, although that can vary somewhat with RPM as shorter stroke times require more force to get the exhaust out. The exhaust pressure is usually not allowed to go below atmospheric pressure since that would waste work.

While under most conditions, it is desirable to vary the timing of the valves for different loads so that the exhaust pressure remains close to atmospheric pressure, that is not the case when it is desired to maximize power output and sacrifice efficiency for a brief period of time, such as when accelerating a vehicle on the entrance ramp to a freeway. In an engine having an expansion ratio of 2:1, for example, the exhaust pressure at BDC might rise to about 15 PSI over atmospheric pressure at maximum power output, and in a lower compression engine having an expansion ratio of 3:1, it might rise to about 30 PSI above atmospheric pressure. The ability to increase power in this manner is useful, and the sacrifice in overall fuel economy is relatively insignificant since it lasts for only a few seconds. It also permits the use of a smaller, lighter, less expensive engine with the same peak power rating as a much larger engine.

The amount of time the intake valve should remain open depends upon the configuration of the engine. In a four cylinder engine with two expansion cylinders and two compression cylinders of equal bore and stroke, for example, the engine operates most efficiently under normal conditions when the intake valve is open for about 40% of the downward stroke of the compression piston. In this example, an expansion ratio of 2.5:1 would allow the exhaust pressure in the expander to be about equal to atmospheric pressure at when the expansion piston is at BDC and the engine is operating at full load.

Figure 2C:
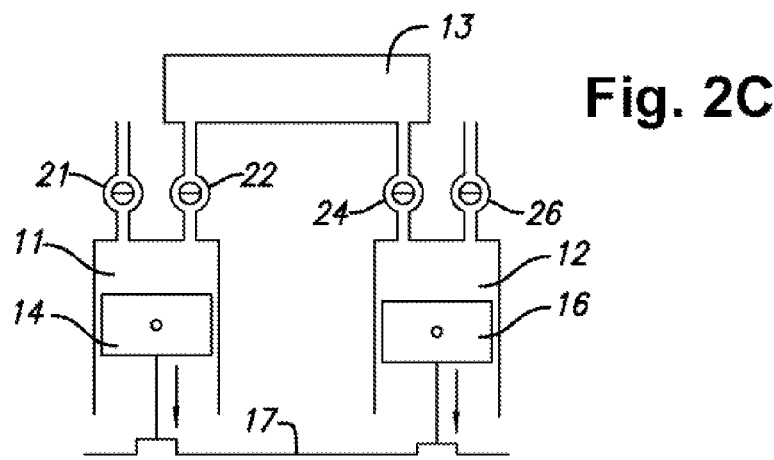

With an engine having two compression cylinders and four expansion cylinders where all six cylinders are of equal bore and stroke, the basic operation of the engine is the same, but the timing of the valves is different to allow the compression cylinders to take in more air. Thus, the six cylinder engine operates most efficiently when the intake valve is open for about 80% of the downward stroke so that with an expansion of 2.5 in the combustion chamber the pressure in the expander will go to atmospheric pressure at BDC when the engine is operating at full load. In the paragraphs which follow, it is assumed that the engine is a four cylinder engine, with cylinders of equal size, and that the intake valve is open for 40% of the downward stroke. When the intake valve closes, the piston continues its downward travel, as illustrated in FIG. 2C.

During the remaining 60% of the downward travel of the compression piston, a subatmospheric or negative pressure is developed in the cylinder above the piston, and that requires work. However, the pressure in the crankcase below the piston typically remains at or above atmospheric pressure, and the work is recovered during the first 60% of the upward stroke when the piston is pushed in the upward direction by the higher pressure below it.

Figure 2D:
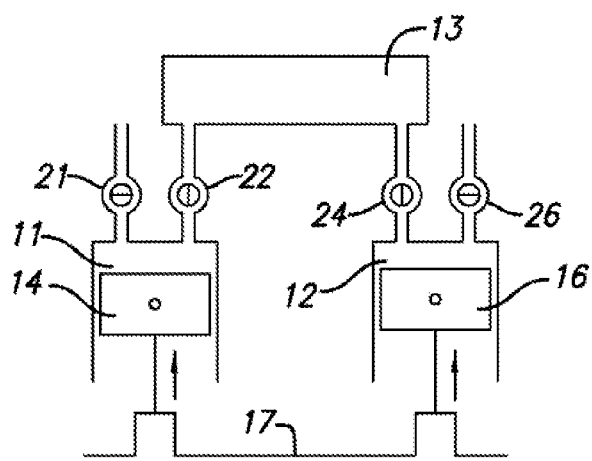

As the compression piston continues its upward travel, the air in the cylinder above it is compressed, and when the pressure in the cylinder reaches the pressure in combustion chamber 13, outlet valve 22 opens as illustrated in FIG. 2D, and the piston pushes the compressed air into the combustion chamber. The outlet valve closes when the compression piston is at or near top dead center, as seen in FIG. 2A.

Inlet valve 24 opens at approximately the same time as outlet valve 22, and the expanding gas is transferred from combustion chamber 13 to expansion cylinder 12, driving expansion piston 16 in a downward direction. The inlet valve remains open until the volume of gas entering expansion cylinder 12 substantially equals the amount of air compressed in compression cylinder 11 times the expansion ratio in the combustion chamber. The amount of expansion is dependent upon the amount of fuel burned per unit of air, and that is determined by the load encountered by the engine.

At full load, for example, with a compression ratio of 9:1, an expansion ratio of 2.5:1 can occur in the combustion chamber with a maximum burn temperature of approximately 1700° K. In this example, the outlet valve will be open for approximately the last 10%-12% of the compression stroke, and the inlet valve will be open for approximately the first 25%-30% of the expansion stroke.

At higher compression ratios, the temperature of the compressed gas is higher, and the pressure in the combustion chamber is higher. To get to the higher compression pressure the outlet valve opens later. With the higher pressure, the inlet vale closes sooner so that when the gas is fully expanded at BDC, it will be at or close to atmospheric pressure.

The expansion ratio which can be used with a given compression ratio is limited by the maximum combustion temperature that can be used without creating pollution. With a compression ratio of 13.5:1, for example, a compression temperature of 850° K. will rise to 1700° K. with an expansion ratio of 2:1, whereas with a compression ratio of 10:1 and a maximum burn temperature of 1700° K., an expansion ratio of 2.25 can be used.

The compression piston does work during the compression of the air and when it is pushing the compressed air into the combustion chamber. The expansion piston provides full pressure work output for approximately the first 25%-30% of its downward stroke and then continues providing work output as the pressure in the cylinder drops to approximately atmospheric pressure as the piston completes its travel to bottom dead center.

Figure 2E:
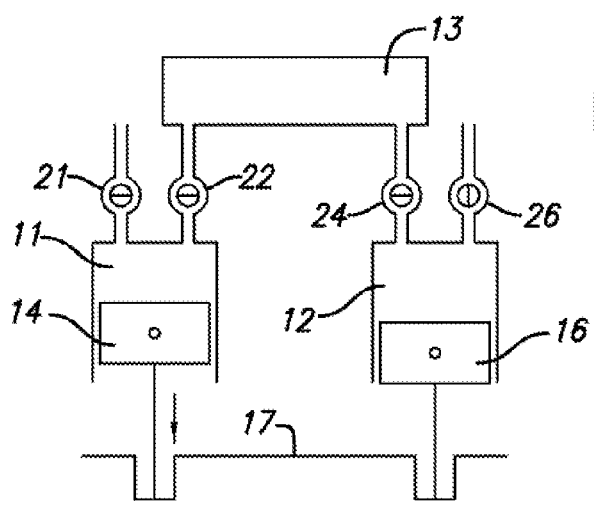

When the expansion piston is at or near bottom dead center, exhaust valve 26 opens, as shown in FIG. 2E, and thereafter the rising expansion piston pushes the exhaust gases out into the atmosphere. Since the exhaust valve opens when the gas in the cylinder is essentially at atmospheric pressure, substantially no energy or work is left in the pressure of the gas, and efficiency is maximized. The exhaust valve closes as the expansion piston approaches top dead center, and the cycle repeats.

A distinctive feature of the invention is the ability to adjust the valves to make the pressure in the expansion cylinder close to atmospheric pressure when the exhaust valve is opened with different loads, thereby maximizing efficiency over a wide range of operating conditions.

As discussed above, some pressure is required to push the gas out of the expansion cylinder, and the target pressure at bottom dead center is therefore typically a couple of PSI above atmospheric pressure. This allows for a shorter expansion stroke than otherwise would be necessary, and engine size can thus be reduced without loss of efficiency.

At lower load conditions, the combustion chamber temperature (burn temperature) is reduced, the expansion of the gas is reduced, and the inlet valve is open for a proportionately shorter period of time. Thus, the total work output is reduced with a smaller amount of gas going to the expansion cylinder. For example, at half load, the fuel injected into the combustion chamber is one-half of the amount injected at full load, and consequently the expansion is only half of what it is with a full load. With the reduced expansion, the inlet valve is open for a smaller portion of the stroke, and in this example, it still opens at or near top dead center, but it stays open for only about 17.5% of the expansion stroke, rather than about 25%-30%. The expansion piston does useful work until the gas in the cylinder is expanded and the pressure drops approximately to atmospheric pressure, which in this example occurs when the piston has traveled about 70% of its downward stroke.

During the last part of the stroke, the expansion piston is working against a partial vacuum and provides negative net work for that part of the stroke. To compensate for the negative work, the exhaust valve is kept closed during the first part of the upward stroke, and the lost work is recovered when the higher pressure below the piston pushes it back up. When the pressure above the expansion piston approaches atmospheric pressure, the exhaust valve is opened, and the exhaust gases are pushed out of the cylinder by the piston as it completes its upward stroke. In the example given, the exhaust valve opens when the piston has moved 30% of its upward travel. With the exhaust valve being opened at atmospheric pressure, no work is lost, and efficiency is maintained. Opening the exhaust valve near atmospheric pressure also avoids loud exhaust noises and can allow the engine to operate without a muffler. Moreover, with factors such as a longer burn time, no cooling of the combustion chamber walls, and good temperature control, the exhaust is much cleaner than in typical Otto and Diesel engines, and consequently the engine may not need a costly catalytic converter either.

The engine is started by introducing air into the compression cylinder, compressing it, pumping the compressed air into the combustion chamber, heating it, and allowing the expanded gas to flow through the inlet valve into the expansion cylinder. This is similar to the normal operation of the engine except that it can be done at very low pressures, e.g. 2-4 atmospheres. The lower pressure can be provided by opening the outlet valve sooner than usual and/or by closing the intake valve sooner, although this may not be as efficient. As air is passed into the combustion chamber and heated, then expanded in the expansion cylinder, the engine will start to develop a work output which is used to keep the engine running. As the engine starts to run, the inlet valve will allow less than the normal amount of gas to enter the expansion cylinder, and that causes the pressure in the combustion chamber to increase until normal operating pressures are obtained. This provides easier starting and the use of a smaller starting motor.

Since the outlet valve of the compression cylinder opens when the pressure in that cylinder reaches the pressure of the gas in the combustion chamber, by varying the timing of the inlet valve, the outlet valve, the intake valve, or a combination thereof, the pressure in the combustion chamber can be built up to the normal level necessary for the running of the engine.

When the combustion chamber pressure increases to its normal level, the engine begins normal operation, with the timing of the valves returning to normal running conditions.

Since the engine can maintain the correct or optimum combustion chamber pressure by varying valve timing, the engine can compensate for situations where normal engine breathing is limited with no loss in performance. Such conditions exist, for example at high altitude, high ambient temperature, and low atmospheric pressure as well as at higher engine RPM. At high altitude, the air is less dense, the barometric pressure is lower, and the reduction in air pressure would normally cause less air mass to be drawn into the compression cylinder. At high ambient temperatures, the density of the air is lower than it would be at normal temperatures, and less air mass would likewise be drawn into the compression cylinder. However, since only a portion of the capacity of the compression cylinder is utilized under normal operating conditions, it is possible to allow the intake valve to be open for a longer period of time when a high ambient temperature or a decrease in barometric pressure is detected. Thus, for example, instead of opening the intake valve for 40% of the intake stroke, it can be opened for 50% or 60% of the stroke as needed, and this extra capacity will allow a greater volume of air to be drawn into the cylinder and compressed to compensate for the air being less dense. The ability to draw in additional air can also be used to compensate for breathing losses that occur at high RPM. The net result in each of these cases is that the same mass of air will be drawn into the engine for any specific load, the same amount of work will be required to compress it, and the same work output will be maintained even though the density of the air is less at high altitude or high temperatures and also when breathing is more difficult at high RPM. In this way, the performance of the engine is maintained over a wide range of ambient conditions without any decrease in efficiency or performance.

Under lower load conditions, the same amount of air is still pumped into the compression cylinder, but less fuel is burned in the combustion chamber. Gas expansion is thus reduced, the inlet valve is allowed to remain open for a shorter period of time, and the work output of the expansion piston is reduced. Under these conditions, the pressure in the expansion cylinder will reach atmospheric pressure before the expansion piston reaches bottom dead center, and negative work is once again done. However, as discussed above, that work is recovered by delaying the opening of the exhaust valve and allowing the higher pressure below the piston to push it up. Once the gas has been compressed back to atmospheric pressure, the exhaust valve is opened to let the gas out.

Thus, the difference in running at partial load is that less fuel is used to heat the mixture in the combustion chamber. With the same amount of air, less fuel produces less heating, and less heating produces less expansion. The reductions in heating and expansion are compensated for by opening the inlet valve for a shorter period of time and by delaying the opening of the exhaust valve. In this way, the efficiency of the engine is maintained throughout the load ranges of the engine.

The engine can be turned off or shut down by turning off the fuel supply or by closing the valves. No work output can occur under those conditions, and the pressure in the combustion chamber will be maintained for some period of time. The pressure stored in the combustion chamber provides quick and easy restarting of the engine, and it also allows the engine to idle at zero RPM, e.g. when the vehicle in which it is installed is stopped at a stoplight and valves which can be closed independently of crankshaft rotation are used.

If all of the valves are closed when the expansion piston is at top dead center, the pistons will not be under pressure to move, and the pressure and temperature will be maintained in the combustion chamber. Since that chamber is well insulated, it will not lose significant temperature or pressure for several minutes. During that time, the engine is not turning, and it is effectively idling at zero RPM.

When valves which cannot seal independently of crankshaft rotation are used, zero RPM idling is not possible. However, with rotary valves such as those disclosed in Ser. No. 11/372,978, the engine can idle at speeds on the order of 50-300 RPM, which is beneficial in saving fuel, even when the valves are driven from the crankshaft.

When power is once again desired from the engine, the valve sequence can pick up where it left off, and hot pressurized gas from the combustion chamber can once again enter the expansion cylinder and do work. If the zero RPM condition is maintained for an extended period of time, the resulting decreases in temperature and pressure are detected by sensors in the combustion chamber, and the engine is allowed to run for a few revolutions in order to maintain a minimum temperature and pressure relationship in the combustion chamber.

When used in vehicles such as automobiles, the engine will provide some degree of braking when it is running and the vehicle is coasting. In this situation, the amount of fuel going to the combustion chamber is greatly reduced, and the work output decreases to the point that the moving vehicle is turning the engine. The frictional and breathing losses associated with turning the engine when there is substantially no energy input from the limited amount of fuel being burned produce mild engine braking and a gradual slowing down of the vehicle. The amount of braking can be increased by opening the exhaust valve when the expansion piston is at bottom dead center so that the work input during the last portion of the expansion stroke will not be recovered during the exhaust stroke. Thus, the braking provided by the engine is variable and is controlled by the timing of the valves.

The engine can also provide very effective braking in tractor-trailer rigs and other large trucks, where valve operation is modified to provide compression release engine braking, one well known form of which is commonly known as "Jake braking". Compression relief braking is much more effective than normal engine braking and can save brake wear and reduce overheating of the brakes, particularly on long downhill grades and steep declines. With the invention, compression release engine braking can be done in several ways which make it highly flexible and adjustable.

One way to provide compression release engine braking is to close the outlet and inlet valves and allow air to enter the expansion cylinder though the exhaust valve during the downward stroke of the expansion piston. The exhaust valve is closed at or near bottom dead center, and the expansion piston then does work while compressing the air in the expansion cylinder during the upstroke. That work slows down the engine and the vehicle. The point at which the exhaust valve opens can be adjusted to provide the amount of braking desired. The opening of the exhaust valve releases the pressure and thereby wastes the work which has been done. The sudden release of the compressed air may produce a considerable amount of noise that comes out the exhaust system, which may require the use of a muffler that otherwise might not be required in normal operation of the engine.

Compression release engine braking can also be provided with the compression cylinder by keeping the outlet valve closed, drawing air into the compression cylinder through the intake valve for all or part of the downstroke of the compression piston, compressing the air during the upstroke, and then opening the intake valve to release the pressure toward the end of the upstroke. The work done in compressing the air slows down the engine and the vehicle, and the amount of braking is controlled by selection of the point at which the valve opens.

The high pressure air is discharged back into the intake manifold which can be closed off from the atmosphere by a one-way flapper valve at the air inlet. Since the manifold is larger than the compression cylinder, the pressure of the air is reduced, and the manifold is filled with air at a relatively low pressure. During this method of compression release engine braking, this same air is moved back and forth between the manifold and the compression cylinder, and no dirt can be sucked back into the cylinder from the manifold because the intake manifold is very clean. Also, since virtually no air can leak out through the flapper valve to the outside atmosphere, the sound of the sudden pressure release is greatly muffled, and an external muffler may not be required.

For maximum compression release engine braking, both the compression and expansion cylinders can be used. This can potentially provide twice the braking force of conventional compression release engine braking systems because conventional engines typically compress air only once every two revolutions whereas the invention can compress it on every revolution.

A one-way flapper valve or other suitable valve can be used to shut off air flow in the exhaust system as well as in the intake manifold. If that is done, the external noise produced by the sudden release of pressure in the expansion cylinder will be greatly reduced because the valve will dampen the sound escaping from the engine.

During compression release engine braking, it is possible to allow small amounts of air and fuel to move through the combustion chamber to allow just enough burning to take place to maintain the desired temperature and pressure so that immediate power will be available when it is desired or needed.

In some embodiments which use rotary valves or other valve systems, it may not always be possible to move the valves far enough and quickly enough to fully utilize the compression release braking capability of the engine. In this case, a small closed chamber and valve can be added to the compression cylinder. The extra chamber can have approximately 1/12 to 1/6 of the volume of the compression cylinder, and when the extra valve is open, the compressed air can enter and be stored in the extra chamber during the compression stroke without being over pressurized and damaging the engine. The valve remains open for as long as compression release engine braking is being used.

When the intake valve is opened at top dead center, the compressed air will escape to the intake manifold, and the engine will be ready for the next cycle. When compression release engine braking is no longer needed, the extra valve is closed, and the other valves resume normal operation.

Figure 3:
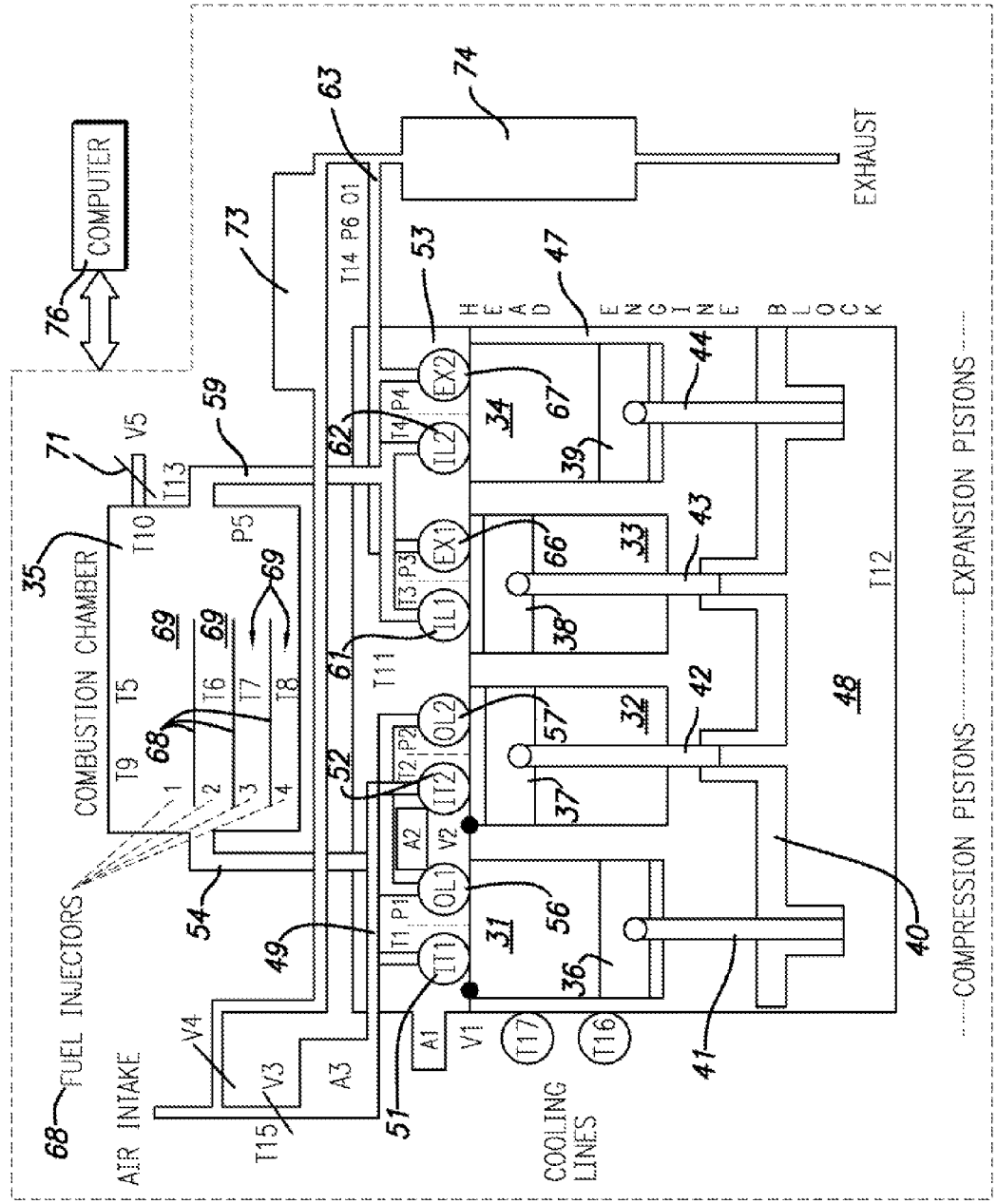
FIG. 3 is a cross-sectional view, somewhat schematic, of an embodiment of a four cylinder, constant pressure, reciprocating piston internal combustion engine incorporating the invention.

FIG. 3 illustrates a four cylinder engine incorporating the invention. This engine has two compression cylinders 31, 32, two expansion cylinders 33, 34 and a combustion chamber 35, with pistons 36, 37 in the compression cylinders and pistons 38, 39 in the expansion cylinders. The pistons are connected to a crankshaft 40 by connecting rods 41-44. The cylinders are formed in an engine block 47, and the crankshaft is located in a crankcase 48 in the lower portion of the block. The two compression pistons are 180 degrees out of phase with each other, as are the two expansion pistons, so that one piston in each pair is on the upstroke while the other is on the downstroke. For good mechanical balance in this particular embodiment, the two outer pistons (compression piston 31 and expansion piston 34) are in phase with each other, as are the two inner pistons (compression piston 32 and expansion piston 33).

Air is supplied to the compression cylinders through an intake manifold 49 and intake valves 51, 52 in cylinder head 53. Those cylinders also communicate with the inlet end of combustion chamber 35 via an outlet manifold 54, with communication between the cylinders and that manifold being controlled by outlet valves 56, 57. The outlet end of combustion chamber 35 communicates with expansion cylinders 33, 34 via an inlet manifold 59, with inlet valves 61, 62 controlling communication between the chamber and those cylinders. Exhaust gases are expelled from the expansion cylinders through an exhaust manifold 63, with communication between the cylinders and the manifold being controlled by exhaust valves 66, 67.

As in the embodiment of FIG. 1, combustion chamber 35 can, for example, be of the type disclosed in Ser. No. 11/372,737, and valves 51, 52, 56, 57, 61, 62, 66 and 67 can be rotary valves of the type disclosed in Ser. No. 11/372,978. Here again, other suitable types of valves can be used, if desired.

Fuel injectors 68 supply fuel to the combustion chamber, with flow separators or baffles dividing the region near the fuel inlet into smaller volumes 69 where the fuel can mix and burn with only a portion of the air introduced into the chamber. A safety relief valve 71 provides protection for the combustion chamber in the event that the pressure in the chamber should ever rise above a safe level.

In this embodiment, air is drawn into compression cylinders 31, 32 during the intake strokes (down) of the pistons in them and is compressed during the compression strokes (up) of the pistons. Since those pistons are 180 degrees out of phase with each other, there are two intake strokes and two compression strokes for each revolution of the crankshaft.

The compressed air from cylinders 31, 32 is delivered to combustion chamber 35 during alternate halves of the operating cycle where it is mixed and burned with the fuel from the injectors. The expanding gas is delivered to expansion cylinders 33, 34 during alternate half cycles where it drives the pistons down and produces work output.

The timing of the valves relative to the pistons in the embodiment of FIG. 3 is the same as it is in the embodiment of FIG. 1, the only difference being that with two compression cylinders and two expansion cylinders, there are two intake strokes, two compression strokes, two expansion strokes, and two exhaust strokes for each operating cycle or revolution of the crankshaft.

In this particular embodiment, a radiator 73 is shown as being connected to exhaust manifold 63 for cooling exhaust gases that are low in oxygen and mixing them with fresh air from the intake if the presence of small amounts of $NO_X$ is detected in the exhaust. The exhaust system is also illustrated as including a muffler 74 in this embodiment. In other embodiments, the radiator and/or the muffler may not be required.

Temperature and pressure sensors monitor conditions throughout the engine and provide that information to a computer 76 which controls the delivery of fuel to the combustion chamber and the timing of the valves in accordance with the environmental and load conditions. Thus, temperature sensors $T1$-$T4$ and pressure sensors $P1$-$P4$ monitor temperature and pressure in the compression and expansion cylinders, and temperature sensors $T5$-$T10$ and pressure sensor $P5$ monitor temperature and pressure in the combustion chamber. Temperature sensors $T11$ and $T12$ monitor temperature in the engine head and crankcase, temperature sensor $T13$ monitors temperature in inlet manifold 59, temperature sensor $T15$ monitors temperature in the intake manifold, and temperature sensor $T14$ and pressure sensor $P6$ monitor temperature in the exhaust manifold. An oxygen sensor $O1$ monitors the level of oxygen in the exhaust manifold, and temperature sensors $T16$, $T17$ monitor temperature in the cooling system for the engine.

Small chambers $A1$, $A2$ provide increased volume above compression pistons 37, 37 to prevent over pressure in the cylinders when using compression release engine braking. Communication between those chambers and the cylinders is controlled by valves $V1$, $V2$.

An additional chamber $A3$ is also included in the intake manifold to provide increased volume for receiving the air which is discharged into that manifold during compression release engine braking. A one-way flapper valve $V3$, or other suitable valve, controls communication between that chamber and the air inlet, allowing outside air to be drawn into the manifold, but preventing the pressurized air from the compression cylinders from being discharged to the atmosphere.

Figure 4:
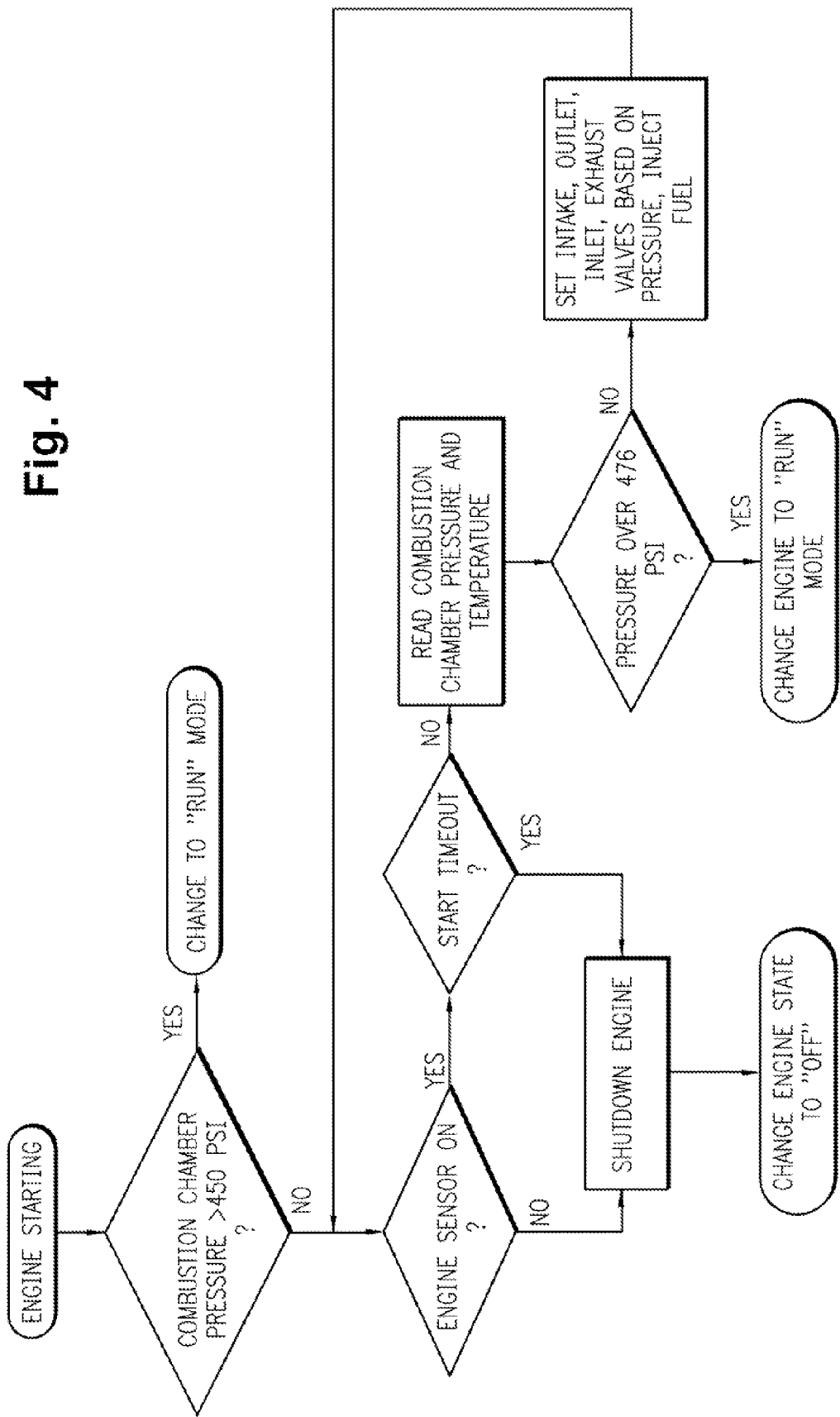
FIGS. 4-7 are flow charts for different phases in the operation of one embodiment of an engine incorporating the invention.

The starting routine for an engine incorporating the invention with a compression ratio of 13:1 is illustrated in the flow chart of FIG. 4. If the pressure in the combustion chamber is not more than 450 PSI and the engine sensor is on, the engine is in the startup mode. As long as the pressure remains below approximately 476 PSI, the intake, outlet, inlet and exhaust valves are set in accordance with the pressure as fuel is injected into the combustion chamber. When the pressure exceeds approximately 476 PSI, the engine switches to the run mode. If the engine sensor is not on or if a timeout occurs before the pressure exceeds approximately 476 PSI, the engine is shut down.

Figure 5:
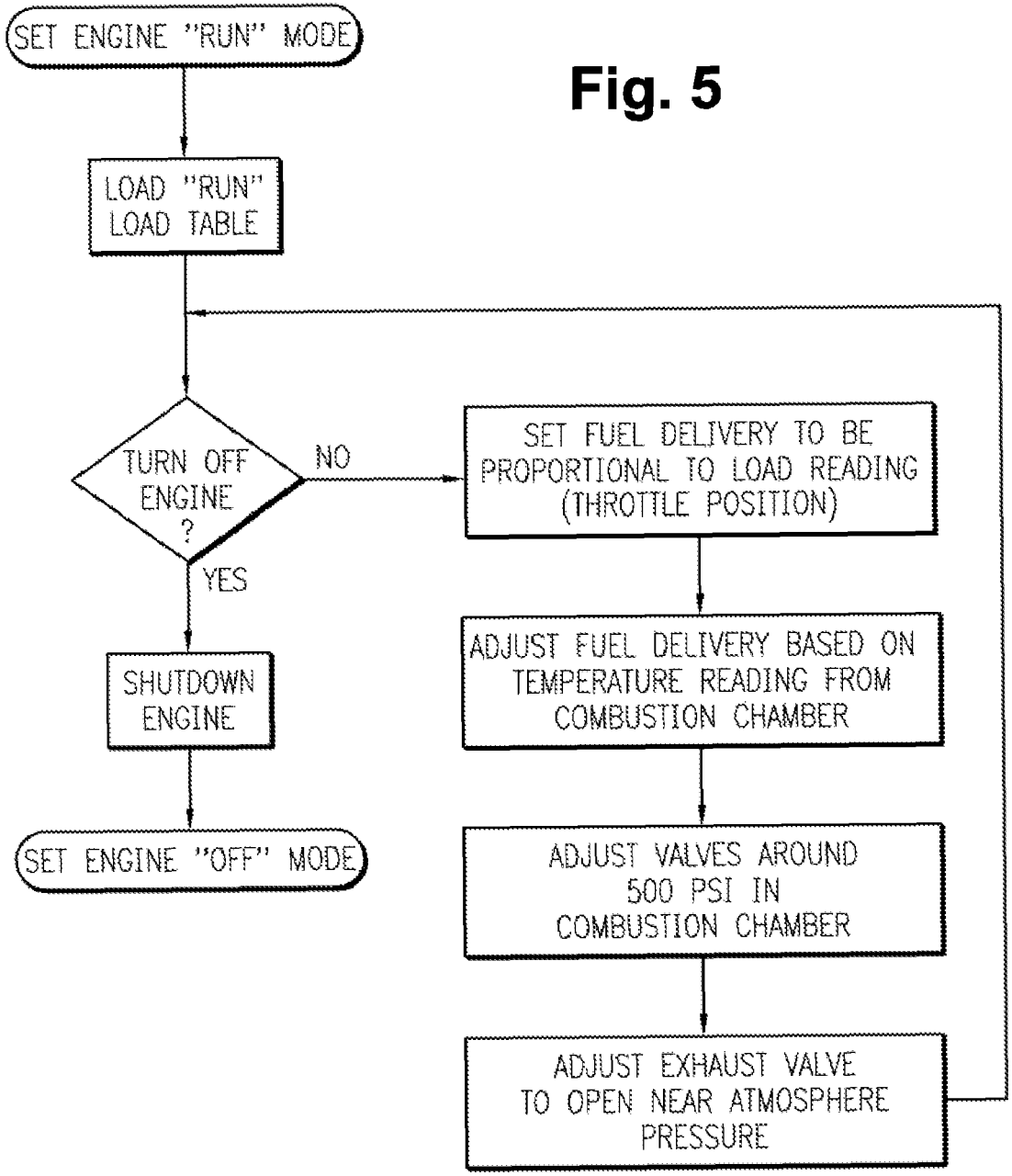

The run mode is illustrated in the flow chart of FIG. 5. A table for different engine loads is stored in memory, and if the engine is running, the air intake and fuel delivery are set to be proportional to the load reading as determined by the throttle position. Air intake is set from look up tables for each load requirement, combustion chamber pressure is monitored, and valve timing is adjusted accordingly to maintain a virtually constant pressure. Temperature is monitored in the combustion chamber, and the fuel delivery is adjusted accordingly. The intake, outlet and inlet valves are set for the load conditions, as is the exhaust valve. This process repeats as long as the engine is running.

Figure 6:
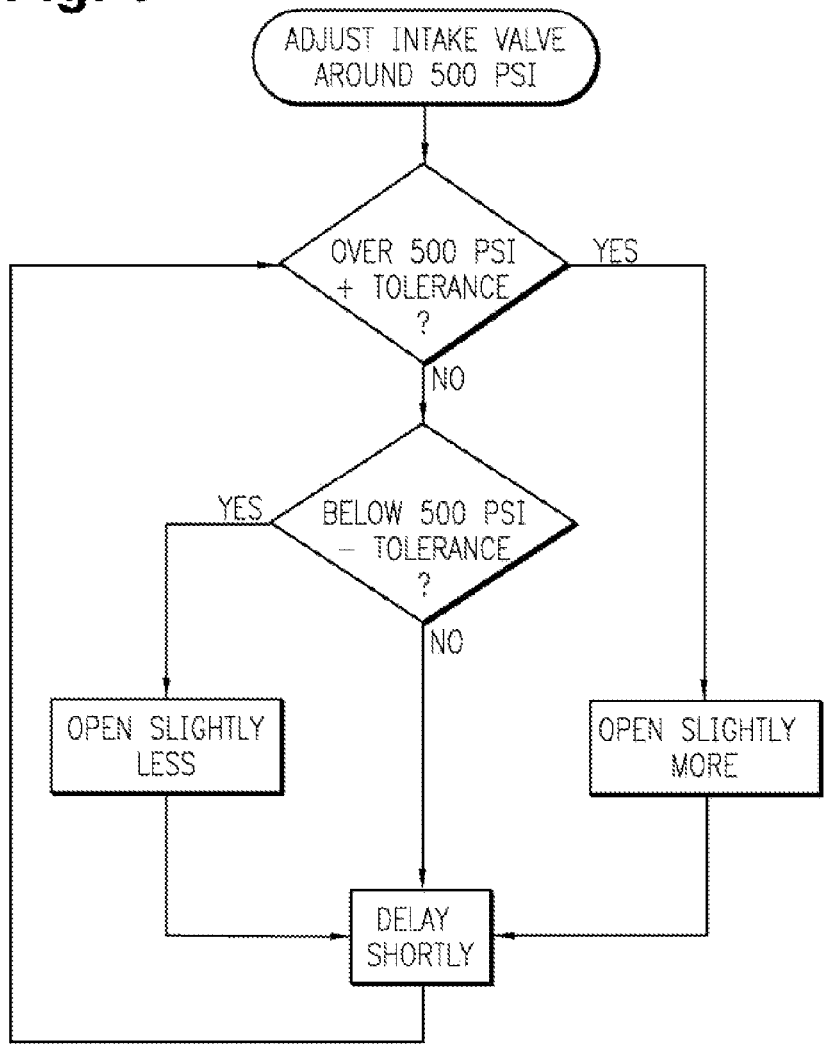

The routine for adjusting the intake and inlet valves is illustrated in FIG. 6. The pressure in the combustion chamber is monitored to see if it is within tolerances above and below 500 PSI. If the pressure is within tolerances, it is checked again after a short time. If it is higher than tolerance, the inlet valve(s) is (are) opened slightly, and the pressure is checked again. If the pressure is below tolerance, the valve(s) is (are) closed slightly, and the pressure is checked again after a short time delay.

Figure 7:
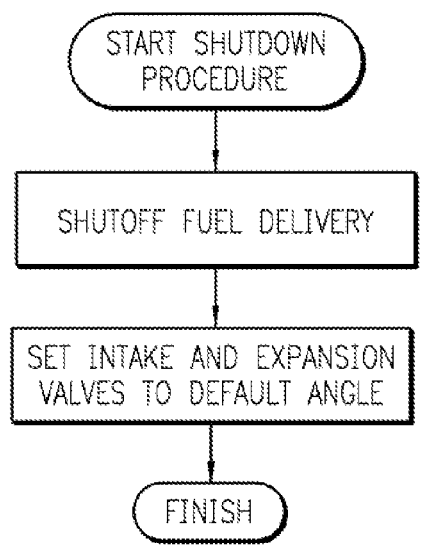

As illustrated in FIG. 7, the shutdown routine consists of shutting off the fuel delivery and setting the valves to their default angles.

With the operation of the valves and the delivery of fuel all under computer control, the engine can be programmed or targeted for a wide variety of different applications simply by changing the software. The exhaust valve can, for example, be programmed to open when the pressure in the expansion cylinder is at or near atmospheric pressure for maximum efficiency. The temperature and pressure in the combustion chamber are software controlled, as are the amount of air taken into the compression chamber and the amount of braking provided by the engine. By simple changes in software, it is possible to trade off efficiency, power, and engine braking. With such a wide range of control, the engine has a flexibility that other engines do not have.

Figure 8:
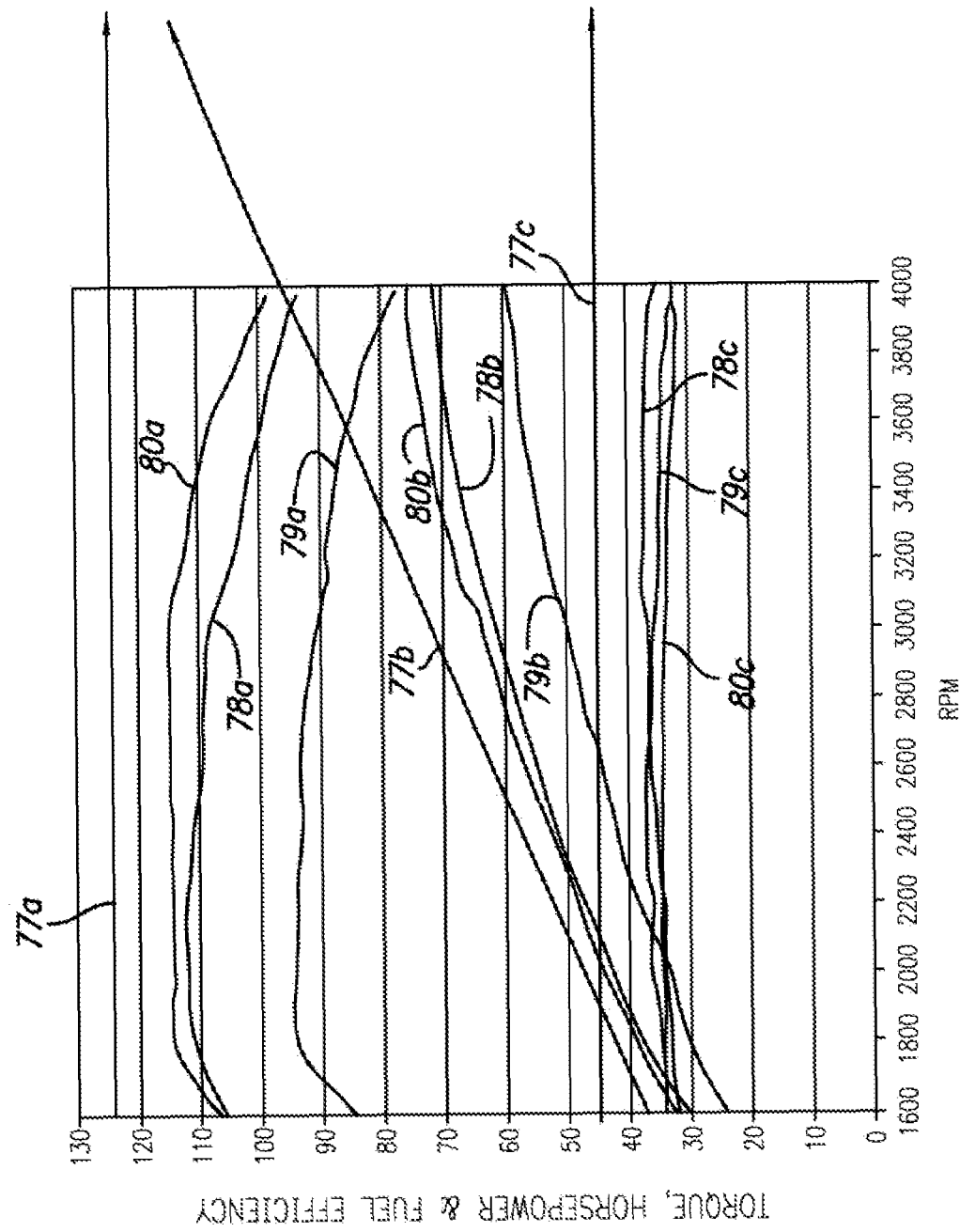
FIG. 8 is a graphical representation of the relative torque, horsepower and fuel consumption for one example of an engine incorporating the invention and representative engines of the prior art operating under comparable conditions.

Torque, horsepower, and fuel efficiency curves for exemplary embodiments of the engine of the invention and conventional Otto, Diesel, and Turbo Diesel engines are shown in FIG. 8. These curves are based upon calculations made for engines of equal air intake (0.95 liter per revolution), with the engine of the invention having a compression ratio of 13:1, an Otto engine having a compression ratio of 9:1, and Diesel and Turbo Diesel engines having a compression ratio of 19.5:1. As these curves show, the engine of the invention produces greater torque and has a much broader and flatter torque range than the Otto, Diesel and Turbo Diesel engines having the same air intake per engine revolution.

Curve 77a represents the calculated torque produced by the engine of the invention, curve 78a represents the calculated torque produced by an Otto engine, and curves 79a and 80a represent the calculated torque produced by Diesel and Turbo Diesel engines. As these curves show, the invention produces a steady torque output of approximately 125 ft-lbs from 1600 RPM to more than 4000 RPM, whereas the torque curves for the other engines drop off significantly below about 1800 RPM and above about 3000 RPM, never reaching the level of the invention. Below 1800 RPM, the Diesel engine produces less than about 95 ft-lbs, and the Otto and Turbo Diesel engines produce less than about 115 ft-lbs. Between 3000 and 4000 RPM, the outputs of the Otto and Turbo Diesel engines drop below 100 ft-lbs, and the output of the Diesel engine drops to well below 80 ft-lbs. Thus, the engine of the invention has a higher, broader, and substantially flatter torque output than the Otto, Diesel and Turbo Diesel engines, and may be able to use a smaller, lighter and less expensive transmission than the other engines.

Curves 77b, 78b, 79b, and 80b represent the calculated horsepower produced by the engine of the invention, the Otto engine, the Diesel engine, and the Turbo Diesel engine, respectively. As these curves show, the invention produces significantly greater horsepower than the other engines, particularly at higher RPM. Thus, at 1600 RPM, the invention produces about 38 HP, the Turbo Diesel engine produces about 34 HP, the Otto engine produces about 32 HP, and the Diesel engine produces only about 25 HP. At 4000 RPM, the invention produces almost 95 HP, the Turbo Diesel engine produces about 75 HP, the Otto engine produces about 70 HP, and the Diesel engine produces less than 60 HP.

Curves 77c, 78c, 79c, and 80c represent the calculated fuel efficiency of the engine of the invention, the Otto engine, the Diesel engine, and the Turbo Diesel. This unit of measure is used rather than the more common miles per gallon in order to provide a more even basis for comparison since Diesel fuel is heavier and contains more energy per gallon than gasoline. Fuel efficiency was calculated as the product of a constant, horsepower and time divided by the number of pounds of fuel consumed. Although the engine of the invention can run on either gasoline or Diesel fuel, the calculations were based upon the use of gasoline in it and in the Otto engine and Diesel fuel in the Diesel and Turbo Diesel engines. As these curves show, the engine of the invention produces about 45 HP-hours per pound throughout its operating range, whereas the other three engines produce no more than about 35 HP-hours per pound and fall off at higher RPM. Thus, the engine of the invention uses approximately 30 percent less fuel to do the same work as the other engines, which means that the operating expense of the engine will be significantly less than that of the other engines.

Figure 9:
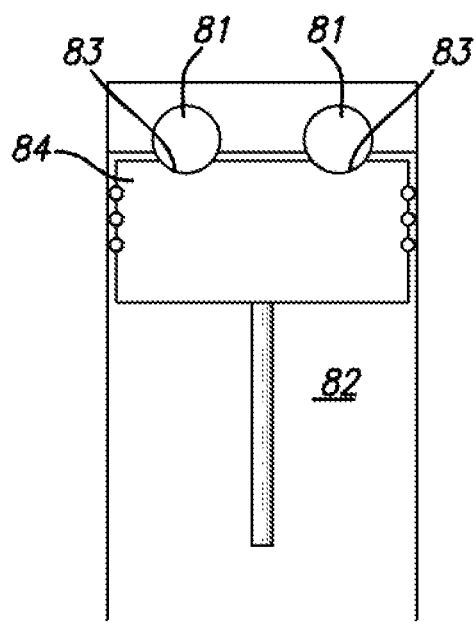
FIG. 9 is a fragmentary cross-sectional view of one embodiment of a cylinder with a piston having a configuration for maximizing the compression ratio in an engine with rotary valves in accordance with the invention.
Figure 10:
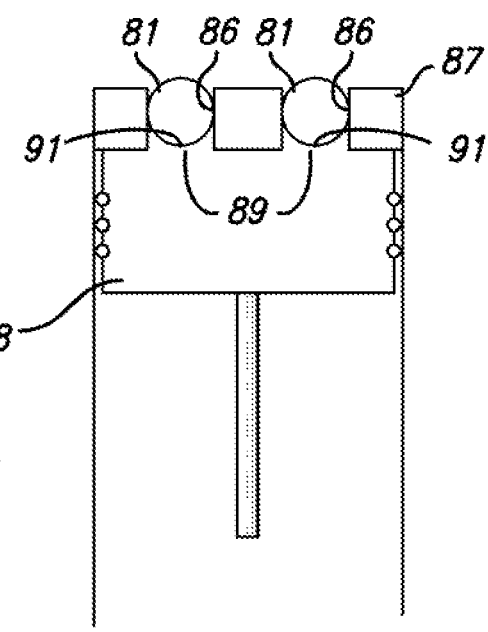
FIG. 10 is a fragmentary cross-sectional view of another embodiment of a cylinder with a piston having a configuration for maximizing the compression ratio in an engine with rotary valves in accordance with the invention.
Figure 11:
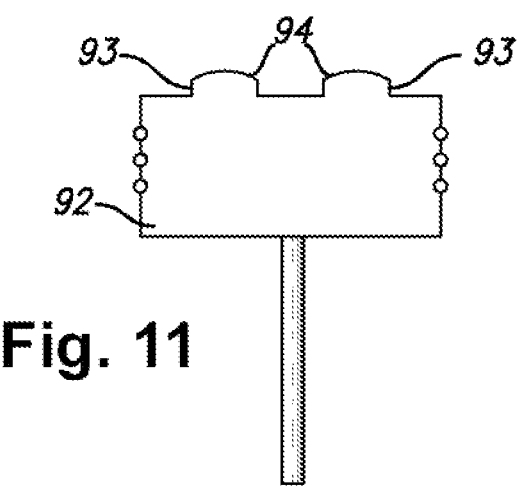
FIG. 11 is a side elevational view of another embodiment of a piston for use in the embodiment of FIG. 10.

As illustrated in FIGS. 9-11, the pistons can be configured to reduce the volumes of the cylinders when the pistons are at top dead center and thereby increase the compression ratio of the engine. This may provide a significant advantage over conventional engines with poppet valves which open into the cylinders and limit the upward travel of the pistons.

In the embodiment of FIG. 9, rotary valves 81 protrude into the upper portion of cylinder 82, and semicylindrical recesses 83 are formed in the upper portion of piston 84 to receive the protruding portions of the valves when the piston is in the top center position. This permits the piston to travel almost to the top of the cylinder, reducing the volume of the cylinder almost to zero and thereby increasing power output and improving the efficiency of the engine.

In the embodiment of FIG. 10, the rotary valves 81 are recessed in ports 86 in cylinder head 87, and piston 88 is formed with projections 89 which extend into the lower portions of the ports. The projections have concave upper surfaces 91 which mate with the curvature of the valves to minimize the volume above the piston in the top dead center position.

The piston 92 shown in FIG. 11 is similar to piston 88 with protrusions 93 which extend into the lower portions of the ports. However, piston 92 differs from piston 88 in that the upper surfaces 94 of piston 92 are slightly rounded or convex in order to avoid any possibility of a gas lock occurring between the piston and the valves. Alternatively, the upper surfaces of the projections can be made flat or even concave as long as the curvatures of the protrusions and the valves do not match so closely that gases can become trapped between the piston and the valves.

The engine can operate with leaner fuel mixtures than other engines, which provides a significant increase in fuel efficiency. It is able to do so because there is no burning of the fuel in the compression and expansion cylinders and, therefore, no chance of burning holes in those pistons as can happen with lean burning in other engines. In a typical embodiment with the segmented combustion chamber, as little as 10 percent of the air going through the chamber needs to support combustion. After burning, the lean mixture is mixed with the other 90 percent of the air, and the gas leaving the combustion chamber has an average temperature that is equivalent to having a burn that was 10 times leaner. The lean burn works well in this engine and is useful for low load, low RPM conditions such as idling. Running lean also generates more heat per unit of fuel and, thus, provides higher efficiency.

In other embodiments, as much as 100% or as little as about 3% of the air passing through the combustion chamber may be used to support combustion. At full power, all the air is used to support combustion, and fuel is injected into all of the segments of the combustion chamber. That does not, however, mean that all of the oxygen is used because the engine runs lean and the burn temperature is held down, e.g. to about 1800° K. in order to prevent pollution. At very low idle speeds, as little as about 3% of the air may be required to maintain the desired idle speed and to keep the burn temperature at a high enough level, e.g. above 1400° K., to prevent the production of CO.

As discussed more fully hereinafter, the engine can also maintain a constant temperature without a segmented combustion chamber or air bypass by using the valves to control the amount of air flowing through the engine per revolution.

The engine can also take in large quantities of air at high RPM. This can provide a significant advantage over engines in which the time available to get a full charge of air decreases proportionately at higher engine speeds. With less air in the cylinder at bottom dead center in a standard engine, not only is there less air available to burn fuel, but the effective compression ratio is also reduced, and that reduces the efficiency and the total work output of the engine. The increased air input at higher RPM is possible because the engine normally does not use all of the air that is available. The intake valve normally closes before the compression piston reaches bottom dead center in order to limit the amount of air taken in and thus provide the correct amount of gas to the expansion cylinder after it is heated and expanded in the combustion chamber. By keeping the intake valve open longer, the engine can provide additional air intake at higher RPM while keeping the compression ratio and efficiency constant. With the efficiency remaining constant, the horsepower produced by the engine continues to increase with increased RPM.

With all of the burning taking place away from the pistons, there is no possibility of the pistons outrunning a flame front regardless of the speed of the engine. Moreover, there are no slow acting springs in the valve system, and there is no valve float to compromise compression or cause parasitic pressure losses that waste engine power. Full burning of the fuel supplied not only gives the engine high efficiency at high engine speeds, but also ensures that all of the energy of the fuel goes into supplying additional horsepower at high RPM, which is not the case in other engines.

Valve timing and efficiency can be changed by software, and the engine can trade efficiency for additional horsepower when needed. High efficiency is obtained, inter alia, by exhausting at or near atmospheric pressure and by controlling the valves accordingly. If additional power is desired, the intake valve can be timed to let in more air which can burn more fuel and produce exhaust pressures which are above atmospheric pressure. The tradeoff between efficiency and power is especially useful for short periods of time, such as when accelerating a vehicle onto a freeway. This temporary loss of efficiency may actually result in an overall improvement in efficiency if the availability of reserve power permits a smaller, lighter and less expensive engine to be used.

In the embodiments described thus far, the engine can be thought of as a constant airflow engine, with the amount of gas passing though the combustion chamber being substantially constant at any given engine speed, or RPM, and the power output being controlled by varying the burn temperature or heat of the gas in the combustion chamber.

Under most operating conditions and loads, the engine can also be operated in a constant temperature mode in which the temperature within the combustion chamber is maintained substantially constant throughout the operating range and the power level is controlled by adjusting the amount of air passing through the engine. Such an embodiment is illustrated in FIG. 12.

Figure 12:
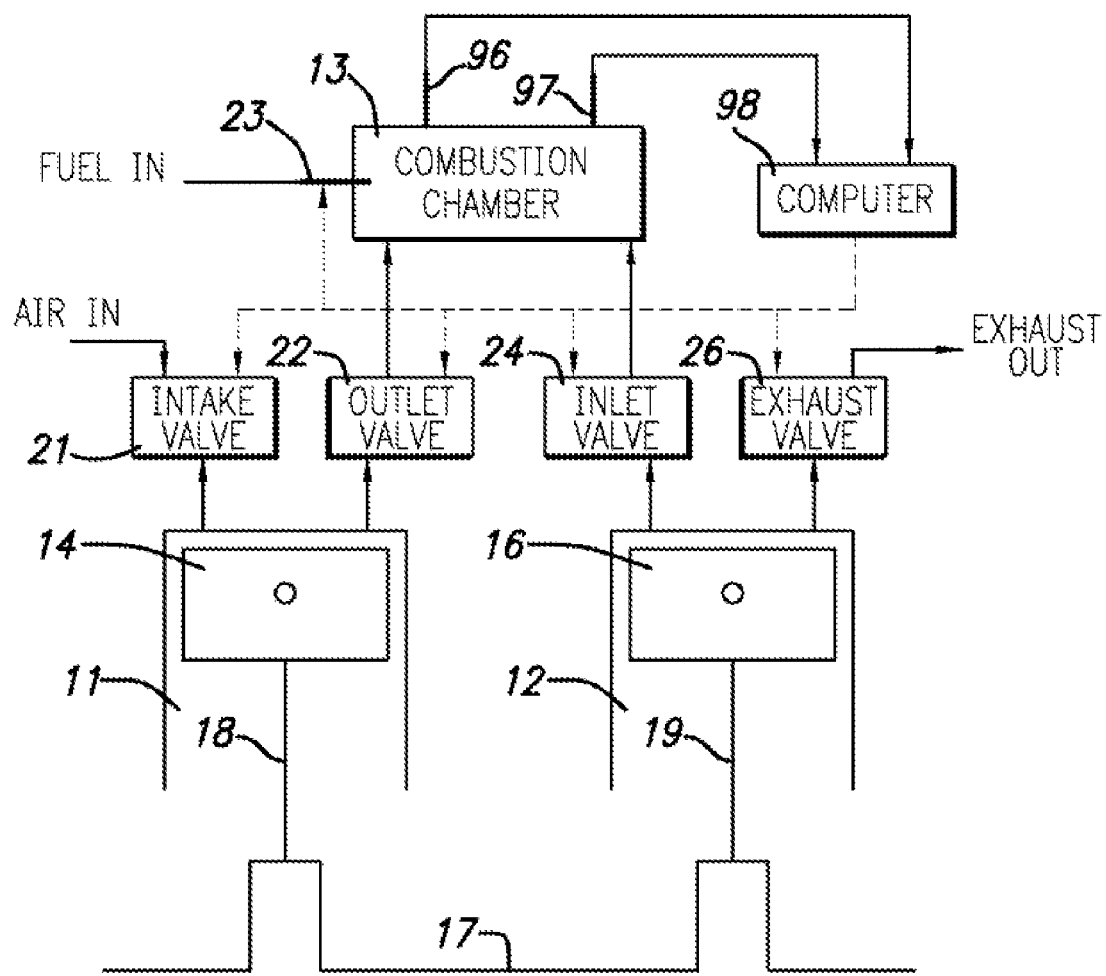
FIG. 12 is a simplified schematic diagram of embodiment of an internal combustion engine incorporating the invention which operates in a constant temperature mode.

The embodiment of FIG. 12 is similar to the embodiment of FIG. 1 in that it has a compression cylinder 11, an expansion cylinder 12 and a combustion chamber 13, with reciprocating pistons 14, 16 forming chambers of variable volume in the two cylinders. The pistons are connected to a crankshaft 17 by connecting rods 18, 19. An intake valve 21 controls the flow of fresh air to the compression cylinder, and communication between the compression cylinder and the combustion chamber is controlled by an outlet valve 22. Fuel is injected into the combustion chamber through a fuel injector 23, and communication between the combustion and the expansion cylinder being controlled by an inlet valve 24. The flow of exhaust gas from the expansion cylinder is controlled by an exhaust valve 26. As in the other embodiments, the valves are all adjustable, with variable opening or closing times, and can, for example, be rotary valves of the type described in detail in Ser. No. 11/372,978. However, as in the other embodiments, they can also be electronic valves or other types of variable valves if desired.

Temperature sensors 96 and pressure sensors 97 monitor the temperature of the burning mixture and the pressure in the combustion chamber, and that information is provided to a computer 98 which controls the amount of fuel introduced into the combustion chamber by fuel injector 23 and the operation of valves 21, 22, 24 and 26. The temperature in the combustion chamber is preferably maintained at a level between 1400° K. and 1800° K. in order to avoid producing $NO_X$, carbon monoxide and/or other pollutants.

By changing the amount of air compressed by the compressor, the amount of fuel burned varies and the work output is controlled without changing the air-to-fuel ratio, the temperature in the combustion chamber, or the pressure in the combustion chamber. The temperature in the combustion chamber is set by the computer-controlled fuel injection, the pressure is maintained by the computer-controlled valve settings, and the air intake is controlled by the computer to match load conditions.

When more power is desired, intake valve 21 is opened longer to let more air into compression cylinder 11, and outlet valve 22 is opened sooner because with more air in the cylinder, the desired compression ratio occurs at an earlier point in the upstroke of compression piston 14. More fuel is injected into combustion chamber 13 so that the temperature of the gas in that chamber remains unchanged even as more gas is delivered to it. Inlet valve 24 stays open a little longer so that the increased amount of gas can enter expansion cylinder 12, and the opening of exhaust valve 26 is advanced so that it opens when the pressure above expansion piston 16 approaches atmospheric pressure on its upstroke.

Temperature sensors 96 monitor the temperature in the combustion chamber, and computer 98 adjusts the amount of fuel delivered to that chamber to maintain the temperature in it substantially constant at a predetermined level throughout the operating range of the engine.

Sensor 97 monitors the pressure in the combustion chamber, and computer 98 adjusts the timing of intake valve 21 and outlet valve 22, as well as inlet valve 20 and exhaust valve 26, to maintain the pressure in the combustion chamber at a substantially constant level.

Decreases in power are produced by opening intake valve 21 for a shorter period of time to reduce the amount of air let into compression cylinder 11, and the opening of outlet valve 22 is delayed to maintain the desired effective compression ratio with less air in the cylinder. The amount of fuel injected into combustion chamber 13 is decreased so that the temperature of the gas in that chamber remains unchanged even though less gas is being delivered to it. Inlet valve 24 closes sooner with less gas entering expansion cylinder 12, and the opening of exhaust valve 26 is delayed since the negative pressure above expansion piston 16 will approach atmospheric pressure at a later point in its upstroke. Here again, the temperature and pressure in the combustion chamber are monitored, and the amount of fuel injected and the timing of inlet valve 24 are adjusted to maintain the temperature and pressure at the desired levels.

With the combustion chamber running at the same temperature under different load conditions, there is no need to use a segmented combustion chamber or multiple fuel injectors to vary the burn temperature as in some of the other embodiments disclosed herein. This makes the engine simpler and less expensive to build.

Also, with a constant temperature engine, response is faster because there is no thermal inertia to overcome when rapid power change is required. While a constant pressure engine may take several seconds or more to go from idle to full power, a constant temperature engine is always at full power temperature so that full power can be realized as quickly as air can be compressed, typically in one or two revolutions or 1/50 of a second at 3000 RPM.

Moreover, with the engine always running at the same temperature, the exhaust gases are always at the same temperature. This makes it easier to scavenge waste heat and further improves efficiency over a wide range of load conditions. Except for the scavenging of the waste heat, an engine operating at constant pressure, as disclosed herein, would operate with the same efficiency as an engine operating at constant temperature, and both would have the same amount of waste heat. However, with an engine operating at constant pressure, the temperature of the exhaust gases can vary over a wide range, e.g. 30° C. to 300° C., whereas the exhaust gases from the constant temperature engine remain at a given temperature, e.g. 300° C. while varying in volume. Notwithstanding the variation in volume, high temperature waste heat at a fixed temperature is much easier to scavenge than waste heat which varies in temperature.

The exhaust gases are at a constant temperature because the air-to-fuel ratio does not change even as the amount of air taken in by the engine is varied with load. As a result, the amount of oxygen in the exhaust remains substantially constant for any particular fuel, and that makes it possible to feed the exhaust gases back to the intake to control $NO_x$-emissions. This is much more difficult to do with exhaust gases from a constant pressure engine without constant temperature as they may have a large amount or no amount of oxygen in them, depending upon the load and the temperature of the burn. Feeding exhaust gases back is also more difficult with Diesel engines and other conventional engines in which power output is varied by changing the air-to-fuel ratio and the exhaust varies in oxygen content.

At lower load conditions, less air is taken in by the engine, less air requires less fuel to maintain the same temperature in the combustion chamber, and because less air is being added to the combustion chamber, the inlet valve is open for a proportionately shorter period of time. Although the percentage of gas expansion remains the same as with higher loads, the total work output is reduced, with a smaller amount of pressurized gas going to the expansion cylinder. For example, at half load, the air intake is half of that at full load, the fuel injected into the combustion chamber is one-half of the amount injected at full load, and consequently the power output is only half of what it is with a full load. With the reduced air intake, the inlet valve is open for a smaller portion of the stroke, and in this example, it still opens at or near top dead center, but it stays open for only about 17.5% of the expansion stroke, rather than about 25%-30%. The expansion piston does useful work until the gas in the cylinder is expanded and the pressure drops approximately to atmospheric pressure, which in this example occurs when the piston has traveled about 70% of its downward stroke. The pressure at BDC is sub-atmospheric, and the exhaust valve does not open until the piston is on its upstroke and the pressure is back up to or slightly above atmospheric pressure. Opening the exhaust valve on the upstroke has the advantage of recapturing any work done by the piston on its downstroke when the pressure is subatmospheric.

Thus, the difference in running at partial load is that less air is taken into the engine by adjusting the intake valve timing. The outlet valve is adjusted to open later so that the compression pressure is maintained with less air intake. Less fuel is needed to heat the mixture in the combustion chamber to the same temperature because there is less air to be heated. With a smaller amount of air, less fuel produces the same amount of heating so that the temperature stays constant while the amount of heated air available to the expander is less. Less available gas for expansion reduces the work output. The reduction in the pressurized gas available for the expander is compensated for by opening the inlet valve for a shorter period of time and by delaying the opening of the exhaust valve. In this way, the efficiency of the engine is maintained throughout the load ranges of the engine.

The power output of the engine can be boosted by the use of a turbo charger or a super charger to boost the pressure of the incoming air. The advantage of doing this in the engine of the invention is that a turbo charger or super charger can increase the inlet pressure by 50 percent and realize additional expander volume for added power output. This can be illustrated by considering several possible configurations of the engine. In these examples, a 2:1 volumetric expansion, or burn ratio, is assumed, but other ratios work equally as well.

As discussed above, the burning of fuel in the engine can easily result in a volumetric expansion of 2:1, and with a volumetric expansion of 2:1 and venting near atmospheric pressure, the ideal ratio of compressors to expanders is 1:2. If desired, other volumetric expansions can, of course, be used, with the ideal ratio of compressors to expanders being the reciprocal of the expansion.

In a four cylinder engine having two compressors and two expanders, there are two power strokes per revolution of the engine. With a 2:1 volumetric expansion and venting near atmospheric, one of the two compressor cylinders could supply all of the gas required by the expanders during normal operation of the engine, with the second helping to compensate for decreased airflow due to altitude, high ambient temperatures, or short cycle time (high RPM).

In a six cylinder engine having two compressors and four expanders, with a volumetric expansion of 2:1, the two compressor cylinders are fully utilized, and there are four power strokes per revolution of the engine.

Figure 13:
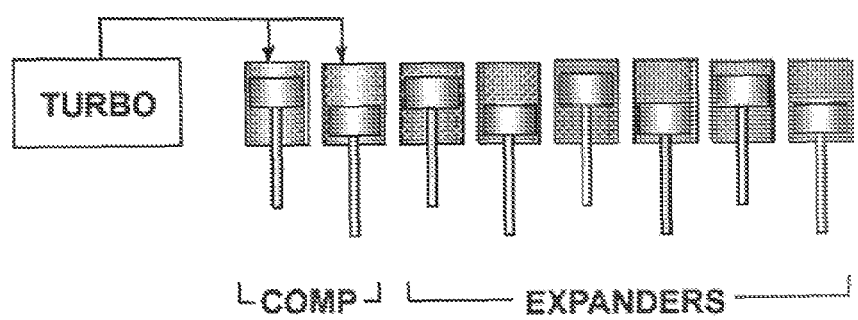
FIG. 13 is a simplified schematic diagram of one embodiment of an internal combustion engine according to the invention with turbo charging.

FIG. 13 illustrates an eight cylinder engine having two compressors, six expanders, and a turbo charger for boosting the intake pressure to the compressors. With a volumetric expansion of 1:2 and without the turbo charger, the two compressor cylinders would not have enough capacity to adequately supply the six expanders at full load. With the turbo charger providing a low pressure boost to increase the intake pressure to the compressors from atmospheric pressure to about 1.5 atmospheres, the two compressors will supply as much air as three compressors receiving air at atmospheric pressure. Thus, the two compressor cylinders are able to fully supply the six expander cylinders with pressurized gas after the volume of the gas is doubled in the combustion chamber.

With the engine of the invention, low-pressure boost can be utilized with any cylinder configuration and/or expansion ratio. It is not limited to cylinders of equal size or to the ratios given in the foregoing examples.

In the constant temperature engine, where the power output is proportional to the amount of air passing through the engine, the boost is most effective at high power levels, and for even higher power levels a higher boot can be used. If a 14.7 psi boost is used, for example, the eight cylinder engine will take in the same amount of air per revolution as a standard eight cylinder engine since two cylinders taking in air at 2 atmospheres is equivalent to four standard cylinders taking in air at atmospheric pressure. However, the engine of the invention will have six power strokes per revolution instead of only four as in a conventional engine.

With higher boost, the engine efficiency may be somewhat less than with a lower boost because the expanded gas in the expansion cylinders will have an exhaust pressure higher than when a smaller boost is used. Thus, some work of expansion will be lost. However, this loss is not very large compared to the significantly increase in the maximum power of the engine.

In all of the disclosed embodiments, with combustion occurring in a separate combustion chamber, the engine can run leaner than engines where combustion takes place in the same cylinders where compression and expansion occur, and running lean generates more heat per unit of fuel and thus provides higher efficiency. Engines in which combustion occurs in cylinders with pistons are limited in their ability to use leaner mixtures because of the possibility of the leaner mixture burning holes in the pistons.

The engine has unusually low heat loss, which further improves efficiency. Pressurized gas can be expanded to its useable limit near atmospheric pressure. Discharging the exhaust gases at atmospheric pressure reduces the temperature of the exhaust and, hence, the amount of heat which is lost with them. Moreover, the head of the engine can be relatively small, with relatively little surface area to lose heat to the ambient air. Also, in an engine which does not require water cooling of the head, there is less heat loss than in engines which are cooled.

The engine produces substantially no $NO_X$, unburned hydrocarbons or carbon monoxide, and emits only minimal particulate matter, smoke and soot, and it does so without additional components such as catalytic converters and particle filters.

In conventional gas and Diesel engines, $NO_X$ is produced when the flame temperature exceeds 1800° K., and it is commonly reduced by monitoring the exhaust and redirecting the exhaust back to the air intake if it is rich in oxygen. With Diesel engines, some form of after treatment with a reducing agent such as urea may also be required.

In the engine of the invention, the temperature in the combustion chamber is monitored and controlled to limit the maximum burn temperature to 1800° K., which is below the range where $NO_X$ is formed. Although the engine temperature can be set to different values for specific needs, the engine is intended to operate at a constant temperature over a wide range of loads and speeds. Since the engine does not have widely varying temperature swings like other engines, temperature control is much easier to maintain and $NO_X$ pollution is much easier to avoid.

Unburned hydrocarbons may occur in some engines because the time the fuel remains in the cylinders is too short for complete combustion, and some of the fuel is left in the cylinders without being burned. In a typical engine running at 3,000 RPM, for example, the fuel must be mixed, ignited and burned and exhaust must start in only $\frac{1}{100}$ of a second. In addition, the water cooled cylinders in such engines can be cold enough to quench the flame front of the burning fuel, which can further prevent all of the fuel from burning. The unburned fuel condenses on the cylinder walls and is then blown out with the exhaust.

The engine of the invention does not produce significant amounts of unburned hydrocarbons. The burning takes place in a thermally insulated combustion chamber which has hot walls that do not quench the flame front and do not cause condensation of the fuel. The combustion chamber operates at high pressure and contains a much larger volume of compressed air than a standard engine. As a result, the gases remain in the combustion much longer than they do in the cylinders of conventional engines, and thus there is more time to complete the burn. The burn time in an engine of the invention is typically 2 to 100 times the burn time in conventional engines. If there is any pollution in the exhaust, it is usually a result of the residence time for the burning gas in the combustion chamber not being long enough, and thus it can be eliminated by increasing the volume of the combustion chamber.

In addition, the combustion chamber produces turbulence which causes more complete mixing and further reduces the chance of having any unburned hydrocarbons. The sharp protrusions that form hot spots in the combustion chamber also create turbulence and help to ensure complete combustion and prevent unburned hydrocarbons from leaving the combustion chamber as pollutants.

Carbon monoxide (CO) is produced in other engines when there is not enough time for complete combustion of the fuel, and/or when the flame temperature is too low for oxygen in the air to combine with CO to produce harmless carbon dioxide ($CO_2$), and/or when there is not enough oxygen to combine with the CO to make $CO_2$.

As discussed above, with the engine of the invention, the fuel remains in the combustion chamber much longer than it does in conventional engines. CO emissions are significantly reduced or eliminated, because there is much more time to complete the burn process. In addition, in embodiments where the burn temperature is maintained at a substantially constant temperature and power output is set by controlling the amount of air entering the engine, the burn temperature is monitored and controlled so that it is always above the 1400° K. required to prevent the production of CO regardless of load. CO production is further prevented by running the engine with leaner fuel mixtures than are possible in other engines. The leaner mixtures have an abundance of oxygen which can combine with CO to convert it to $CO_2$. With the abundance of oxygen and by operating at the correct temperature for extended periods of time, the engine can avoid producing measurable amounts of CO.

Soot and other particulate matter are typically produced by the high pressures that are present in very high compression ratio engines by injecting fuel into air that is too hot and by burning rich fuel mixtures. With the engine of the invention, however, the long residence time of the fuel in the combustion chamber is effective in burning up particulate matter and soot and thereby converting it from a carbon rich material to water vapor and $CO_2$. In addition, in some embodiments, the engine operates most efficiently with compression ratios between 10:1 and 15:1 where the potential for making soot is substantially less than in Diesel engines which operate at significantly higher compression ratios. Soot production is further reduced by maintaining the temperature of the air at the point of injection below the temperature at which soot is produced. Thus, for example, with the engine having a compression ratio of 13:1, the temperature of the compressed air is about 850° K., which is below the critical fuel injection temperature for soot production (900° K.) and also well below the injection temperatures of Diesel engines which are typically about 1200° K. Also, with the lean fuel mixtures on which the engine can operate, there is an abundance of oxygen to complete the burning process and convert all of the soot into water vapor and harmless carbon dioxide.

Figure 14:
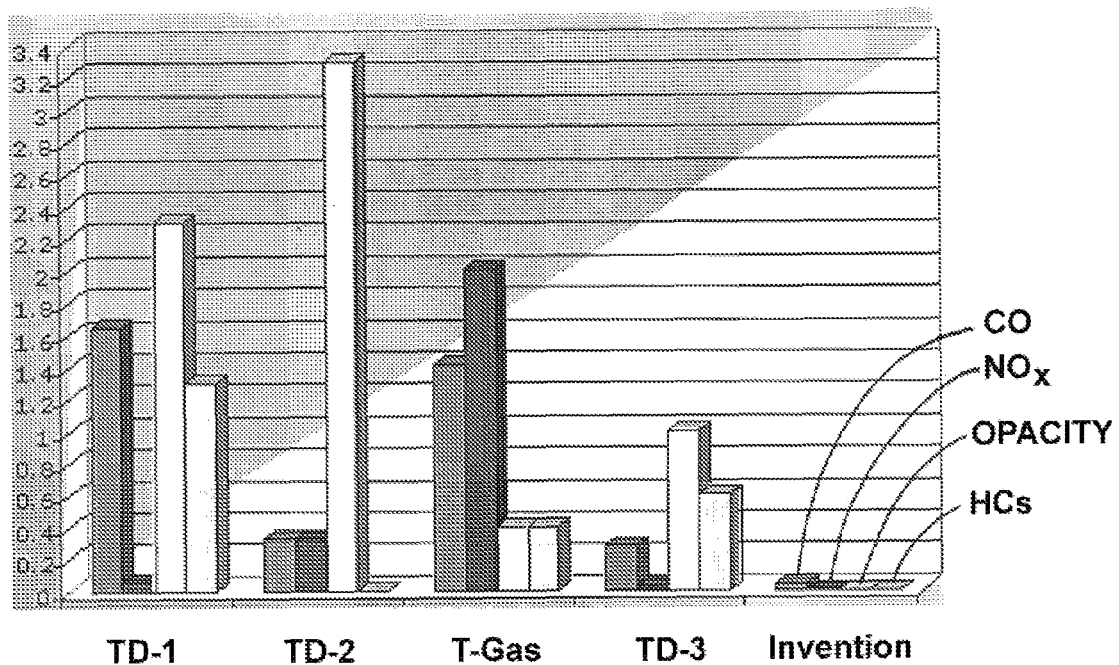
FIG. 14 is a graphical representation of the relative pollution products produced by an engine incorporating the invention and by other engines.

With the longer burn time and no cool spots to quench the flame, the engine of the invention provides nearly complete combustion without after treatment such as a catalytic converter or filter. FIG. 14 illustrates the low levels of pollutants produced by the engine of the invention without after treatment in comparison with the pollutants produced by other modern engines after treatment by a catalytic converter. The pollutants shown in this graph are CO, $NO_X$, opacity (a measure of soot and smoke), and hydrocarbons, with the amounts of CO, $NO_X$, and hydrocarbons being shown in parts per thousand (ppt) and the opacity being shown as a percentage. The engines include three turbo charged diesels TD-1, TD-2, TD-3 and one turbo charged gasoline engine T-Gas in addition to the engine of the invention.

As can be seen from FIG. 14, the CO produced by the three tubo diesel engines ranges from about 0.2 to 1.6 ppt, and the CO produced by the turbo charged gas engine is approximately 1.4 ppt. In contrast, the CO produced by the engine of the invention is close to zero. The $NO_X$ produced by the turbo diesel and turbo gas engines ranges from less than 0.1 ppt to almost 0.3 ppt for the diesels and is almost 2.0 ppt for the gas engine. The opacity of the exhaust from the three turbo diesels ranges from about 1.0 percent to more than 3.2 percent, and the opacity of the exhaust from the turbo gas engine almost 0.4 percent. The hydrocarbons produced by the diesels range from zero ppt to more than 1.2 ppt, and the hydrocarbons produced by the gas engine are about 0.4 ppt. In contrast, the engine of the invention produces almost no $NO_X$ and no hydrocarbons, and the opacity of the exhaust from that engine is essentially zero.

Although other engines can produce low pollution for some pollutants they cannot provide low pollution for all pollutants simultaneously even when using expansive catalytic converters. The engine of the invention can provide virtually zero pollution for all the mentioned pollutants simultaneously even without the aid of catalytic converters or other after treatment.

Temperature plays a very important part of pollution control in today's engines. As discussed above, low temperatures can cause incomplete combustion and the formation of CO, and high temperatures can cause the production of $NO_X$. Conventional engines attempt to reduce the maximum temperature by reducing the oxygen in the cylinder, recirculating exhaust gases, altering ignition and/or fuel injection, and reducing the compression ratio.

The constant pressure engine of the invention can maintain burn temperatures within the range of 1400° K. to 1800° K. by using a segmented combustion chamber and bypasses so that a controlled portion of the gas is passes through the area where the burn is taking place. With its computer controlled fuel injection and valves, the constant temperature engine can easily provide a desired temperature in the 1400° K. to 1800° K. range without a segmented chamber or bypassing.

The very low pollution levels in the exhaust from the engine of the invention have caused speculation as to the mechanism that controls $NO_X$ production and recombination. It now appears that it may be possible to operate at temperatures above 1800° K., e.g. 2000° K. or more, without the production of $NO_X$ because of the long burn time provided by the engine. Although the exact mechanism is not known, it is believed that the $NO_X$ molecule may not be stable at higher temperatures and that it dissociates into its components which recombine to form O2 and N2, which are more stable. In conventional engines, the $NO_X$ pollutants are cooled rapidly and the $NO_X$ molecule is frozen as $NO_X$ before it can dissociate into oxygen and nitrogen which recombine into harmless $O_2$ and $N_2$.

In the constant temperature engine, other operating parameters can also remain constant. This is a significant advantage because It is easier to maintain high performance, prevent pollution, and maintain high efficiency if parameters such as the air to fuel ratio, spark advance, and compression ratio are not constantly changing with load, engine speed, and driving conditions. Table 1 lists engine parameters that are desirable to have constant and shows which of those parameters are constant with different engine designs. In this table "Const P" designates a constant pressure engine, and "Const T/P" designates the constant temperature, constant pressure engine of the invention.

TABLE 1

| Engine Parameters | Diesel | Otto | Const P | Const T/P |
|---|---|---|---|---|
| Compression Ratio | Constant | Variable | Constant | Constant |
| Air Fuel Ratio | Variable | Constant | Variable | Constant |
| Burn Temperature | Variable | Variable | Variable | Constant |
| Burn Pressure | Variable | Variable | Constant | Constant |
| Exhaust Pressure | Variable | Variable | Constant | Constant |
| Exhaust Temperature | Variable | Variable | Variable | Constant |
| Torque 700-4000 RPM | Variable | Variable | Constant | Constant |
| Air Intake to HP Ratio | Variable | Variable | Variable | Constant |
| Efficiency at Large and Small Loads | Variable | Variable | Constant | Constant |
| Percent of Oxygen in Exhaust | Variable | Constant | Variable | Constant |

In general, the more of these parameters are constant, the easier it is to provide pollution-free, high efficiency over all engine loads and speeds. As can be seen from the table, in a diesel engine only the compression ratio remains constant, and in an Otto cycle engine only the air-to-fuel ratio and the percentage of oxygen in the exhaust remain constant. In the constant pressure engine of the invention, the compression ratio, burn pressure, exhaust pressure, torque, and efficiency at large and small loads remain constant, and in an engine in which the temperature and pressure are both constant, the compression ratio, fuel-to-air ratio, burn temperature, burn pressure, exhaust pressure, exhaust temperature, torque, air intake to horse power ratio, efficiency at large and small loads, and percentage of oxygen in the exhaust all remain constant.

Although it is useful to have all four of the valves (intake, outlet, inlet, and exhaust) be variable in a constant pressure engine, a constant pressure engine can be run with only the inlet and outlet valves being variable. However, in a constant pressure, constant temperature engine in which air flow through the engine is varied to control power output, the engine runs most efficiently when the intake, outlet, inlet, and exhaust valves are all variable. The constant temperature engine can also run with two or more of valves of fixed timing, but efficiency would be compromised at some loads.

The invention has a number of important features and advantages. With widely variable valve timing, complete burning of fuel at all engine speeds and loads, and the ability to vary the amount of air intake and exhaust pressures without doing any net work against atomspheric pressure, the invention provides a highly flexible engine which can operate with high efficiency at substantially all engine speeds and load conditions.

By separating the compression, combustion, and expansion phases of the cycle, better control of each is obtained, and efficiency is improved by exhausting the spent gases from the expansion cylinder at or near atmospheric pressure, where the energy remaining in them due to pressure is negligible. This results in a significant improvement over other engines where as much as 30 percent of the total engine power is wasted through the exhaust. As the pressure of the exhaust gases is reduced, so is the temperature of the gas being expanded, and lower exhaust temperatures also provide higher engine efficiency.

With the variable valves, the compression ratio of the compression cylinders and the expansion ratio of the expansion cylinders can be adjusted by controlling the amount of air taken into the compression cylinders and the amount of gas delivered to the expansion cylinders. In addition, the expansion ratio can be made higher than in the compression ratio, which is not possible in other engines.

The invention also avoids the loss of power and efficiency which occurs in other engines when the pressure in the cylinders drops below atmospheric pressure and the engine must do work against the atmospheric pressure on the under sides of the pistons. By controlling the valve timing so that no valve in the compressor or expander is opened on the upstroke of a piston until the pressure in the cylinder is no longer subatmospheric, the work done against atmospheric pressure is stored and then recaptured so the net effect on the efficiency of the engine for having done work against atmospheric pressure is essentially zero.

With no valves extending into the cylinders, the volumes of both the compression cylinders and the expansion cylinders can go almost to zero when the pistons are at their top dead center positions, and volumetric efficiency is, thus, maximized which further adds to fuel efficiency.

Moreover, the engine does not have the problem of decreased efficiency which other engines may experience when the amount of air admitted on the intake stroke is reduced at power levels less than full power. The problem arises in other engines because reducing the air intake causes the pressure in the cylinder to drop below atmospheric pressure during the downward stroke of the piston. This reduced amount of air reduces the effective compression ratio and, thus, the efficiency of the engine and causes the piston to do lost work against the atmospheric pressure on the underside of the piston. The engine of the invention, however, does not have that problem because the top dead center pressure of the compression cylinder is determined by when the outlet valve opens to admit the compressed air to the combustion chamber and when the inlet valve closes, which determines how much air is admitted to the compression cylinder. Since the volume of the compression cylinder goes almost to zero, the compression pressure can be set to almost any desired level regardless of how much air was admitted to the cylinder. Thus, constant efficiency can be provided at varied air intake levels.

Another advantage of the invention is that the engine can run with a substantially constant compression ratio under substantially all load conditions, whereas in other engines the compression ratio can vary with load by as much as a factor of 3. Since the efficiency of an internal combustion engine is proportional to the compression ratio (at least for ratios up to about 20:1), with the substantially constant compression ratio, the efficiency of the engine remains high throughout its range of operation.

Moreover, with the compression ratio substantially constant and the exhaust pressure effectively equal to atmospheric pressure at all loads and speeds, the torque of the engine is also substantially constant for all loads and engine speeds. Furthermore, with combustion not taking place in a cooled chamber with moving pistons, the engine does not have limitations on speed and torque that other engines typically have. There is no piston to outrun the flame front and no possibility of valve float. This allows the engine to run very efficiently at all speeds and loads.

The flat torque curve has another advantage in that it allows the engine to be used with a transmission which has fewer gears and is therefore smaller, less expensive, and lighter in weight than the transmissions required by other engines. This reduction in weight further increases fuel efficiency.

Since the fuel is fully burned in a separate combustion chamber, full power is applied to the expansion pistons when they are at top dead center. Therefore, the expanding gases push on the pistons for more of their stroke than in other engines where the flame front moves slowly and does not produce maximum pressure until the flame front reaches the cylinder walls and the pistons have moved well past top dead center, e.g. 45 degrees past top dead center in an engine running at 3,000 RPM. Thus, the maximum pressure is available longer and the total work output is greater for a given amount of hot gas. This also results in higher fuel efficiency than is possible in other engines.

The engine provides a significant improvement in fuel efficiency, and with closed loop pressure and temperature controls and no combustion in the cylinders with moving pistons, it produces substantially no $NO_X$, unburned hydrocarbons or CO, and emits minimal particulate matter such as smoke or soot. Since the engine runs so cleanly and quietly, in many applications it may not require either a catalytic converter or a muffler. The engine can run on different fuels, and can make necessary adjustments automatically as different fuels are supplied.

In some embodiments, the engine provides variable engine braking as well as very efficient and effective compression release engine braking which is also much quieter than such braking with conventional Diesel engines. Unlike other internal combustion engines, the engine of the invention is capable of operating at high efficiency even at partial loads. The engine is easy to start and does not need a dedicated starting motor. It requires no spark plugs or ignition system, and maintenance requirements are low.

The ratio of compression cylinders to expansion cylinders is not fixed, and the cylinders can also have similar or different bores and/or strokes. For example, a 4-cylinder engine may have two compression cylinders and two expansion cylinders. A 6-cylinder engine may have two compression cylinders and four expansion cylinders or an equal number of each. Similarly, different embodiments of the engine can have different numbers of combustion chambers.

Moreover, with the invention, the horsepower of a given engine can be greatly increased for a short period of time without appreciably affecting the overall efficiency of the engine. Thus, by sacrificing efficiency for a just few seconds at a time, horsepower can be increased by 50% or more, when needed, such as when accelerating a vehicle onto a freeway.

In the embodiments in which temperature is maintained substantially constant and power is varied by controlling amount of air passing through the engine, there is substantially no chance of producing pollution as a result of having the engine running too hot or too cool, and the engine also has many of the same advantages as the other embodiments disclosed herein. It can, for example, start at low compression ratios, e.g. 3:1 or 4:1, and generally does not require a dedicated starting motor. It can idle at a speed of about 50 RPM, and has a substantially flat torque curve. It can burn a variety of fuels without producing $NO_x$, CO, unburned hydrocarbons, or soot, and it permits good volumetric efficiency by allowing the volumes in the cylinders go almost to zero with the pistons in their top dead center positions.

As in the other embodiments, the valving and intake manifold can be utilized to provide quiet compression release engine braking. The engine can have different combinations of piston diameters and strokes and different numbers of compression and expansion pistons. It also has the ability to increase air intake when air density is low due to atmospheric conditions, high altitude, or high ambient temperatures, and power boosts can be provided by increasing air intake to an amount greater than that which can be expanded to atmospheric pressure.

Although the temperature can remain constant over a wide range of engine speeds and loads, the temperature chosen can be varied for different considerations such as extending part life or to provide the fastest response to power increases. As a result, the engine can be referred to as an adjustable constant temperature engine, and somewhat surprisingly, the pressure may also stay virtually constant in this constant temperature engine. Work output and fuel consumption are controlled by controlling the amount of air compressed by the compressor. Efficiency is not lost as it is in other engines that restrict air flow because the engine recovers work that is done at reduced pressure and because the engine maintains the same high efficiency and effective compression ratio at all loads, speeds, and conditions.

With the intake, outlet, inlet, and exhaust valves all being variable and under computer control, the engine can be operated in a constant pressure mode, a constant temperature mode, or a constant pressure and constant temperature mode with just a change in software.

It is apparent from the foregoing that a new and improved internal combustion engine and method have been provided. While only certain presently preferred embodiments have been described in detail, as will be apparent to those familiar with the art, certain changes and modifications can be made without departing from the scope of the invention as defined by the following claims.

The invention claimed is:

1. An internal combustion engine, comprising: a compression chamber of variable volume for compressing air taken into the engine, a combustion chamber for receiving compressed air from the compression chamber, means for introducing fuel into the combustion chamber to mix with air from the compression chamber and form a mixture which burns and expands, an expansion chamber having an output member which is driven by expanding gas from the combustion chamber, means for maintaining the temperature within the combustion chamber at a substantially constant level throughout the operating range of the engine, and means for controlling the amount of air passing through the engine to determine the power produced by the engine.

2. The engine of claim 1 including means for maintaining the temperature in the combustion chamber at a temperature between 1400° K. and 1800° K.

3. The engine of claim 1 including means for maintaining the temperature in the combustion chamber at a temperature between 1400° K. and 2000° K.

4. The engine of claim 1 including means for monitoring pressure in the combustion chamber and adjusting the flow of expanding gas from the combustion chamber to the expansion chamber to maintain the pressure in the combustion chamber at a substantially constant level.

5. The engine of claim 1 including means for boosting the pressure of the air to a level above atmospheric pressure before the air is taken into the engine.

6. The engine of claim 1 including means for controlling exhaust from the engine such that the exhaust is discharged at or near atmospheric pressure.

7. The engine of claim 1 wherein the compression chamber and the expansion chamber are cylinders with reciprocating pistons connected together by a crankshaft.

8. A method of operating an internal combustion engine, the steps of: introducing air into a compression chamber, compressing air in the compression chamber, delivering compressed air from the compression chamber to a combustion chamber, introducing fuel into the combustion chamber to mix with the air from the compression chamber and form a mixture which burns and expands, expanding gas from the combustion chamber in an expansion expansion chamber having an output member which is driven by expanding gas, maintaining the temperature within the combustion chamber at a substantially constant level throughout the operating range of the engine, and controlling the amount of air passing through the engine to determine the power produced by the engine.

9. The method of claim 8 wherein the temperature in the combustion chamber is maintained at a substantially constant temperature between 1400° K. and 1800° K.

10. The method of claim 8 wherein the temperature in the combustion chamber is maintained at a substantially constant temperature between 1400° K. and 2000° K.

11. The method of claim 8 including the steps of monitoring pressure in the combustion chamber and adjusting the flow of expanding gas from the combustion chamber to the expansion chamber to maintain the pressure in the combustion chamber at a substantially constant level.

12. The method of claim 8 including the step of boosting the pressure of the air to a level above atmospheric pressure before the air is introduced into the compression chamber.

13. The method of claim 8 wherein exhaust is discharged from the expansion chamber at or near atmospheric pressure.

14. The method of claim 8 wherein the expanding gas drives a reciprocating piston in the expansion chamber.

15. An internal combustion engine, comprising: compression and expansion chambers of variable volume, a combustion chamber, an intake valve for controlling air intake to the compression chamber, an outlet valve for controlling air flow from the compression chamber to the combustion chamber, an inlet valve for controlling communication between the combustion chamber and the expansion chamber, an exhaust valve for controlling exhaust flow from the expansion chamber, means for introducing fuel into the combustion chamber to mix with air from the compression chamber and form a mixture which burns and expands, means for controlling operation of the intake valve to control the amount of air passing through the engine and, hence, the amount of power produced by the engine, means for monitoring temperature in the combustion chamber, and means responsive to the temperature in the combustion chamber for controlling the amount of fuel introduced into the combustion chamber and burned with the air to maintain the temperature in the combustion chamber at a substantially constant level throughout the operating range of the engine.

16. The engine of claim 15 including means for monitoring pressure in the combustion chamber and controlling the inlet valve to maintain a desired level of pressure in the combustion chamber.

17. The engine of claim 15 including means for increasing the power produced by the engine by opening the intake valve for a longer period of time to allow more air to be taken into the compression chamber, and means for injecting more fuel into the combustion chamber to maintain the temperature of the burning gas at the substantially constant level even though more air is taken into the compression chamber and delivered to the combustion chamber.

18. The engine of claim 15 including means for boosting the pressure of air supplied to the compression chamber to a level above atmospheric pressure.

19. The engine of claim 15 including means for advancing the opening of the outlet valve to maintain a desired compression ratio in the compression chamber when more air is taken into the compression chamber.

20. The engine of claim 15 including means for delaying the closing of the inlet valve to allow additional gas to pass from the combustion chamber to the expansion chamber.

21. The engine of claim 15 including means for controlling the opening of the exhaust valve to allow pressure in the expansion chamber to reach a level at or near atmospheric pressure before the exhaust valve opens.

22. The engine of claim 15 wherein the compression chamber and the expansion chamber are cylinders with reciprocating pistons connected together by a crankshaft.

23. A method of operating an internal combustion engine having compression and expansion chambers of variable volume, a combustion chamber, an intake valve for controlling air intake to the compression chamber, an outlet valve for controlling air flow from the compression chamber to the combustion chamber, an inlet valve for controlling communication between the combustion chamber and the expansion chamber, and an exhaust valve for controlling exhaust flow from the expansion chamber, the steps of: introducing air into the compression chamber, compressing air in the compression chamber, delivering compressed air from the compression chamber to the combustion chamber, introducing fuel into the combustion chamber to mix with air from the compression chamber and form a mixture which burns and expands, controlling the amount of air passing through the engine and the amount of power produced by the engine by operation of the intake valve, monitoring temperature in the combustion chamber, and controlling the amount of fuel introduced into the combustion chamber and burned with the air to maintain the temperature in the combustion chamber at a substantially constant level throughout the operating range of the engine.

24. The method of claim 23 including the steps of monitoring pressure in the combustion chamber and controlling the outlet and inlet valves to maintain a desired level of pressure in the combustion chamber.

25. The method of claim 23 wherein the power produced by the engine is increased by opening the intake valve for a longer period of time to allow more air to be taken into the compression chamber, and injecting more fuel into the combustion chamber to maintain the temperature of the burning gas at the substantially constant level even though more air is taken into the compression chamber and delivered to the combustion chamber.

26. The method of claim 23 including the step of boosting the pressure of the air to a level above atmospheric pressure before the air is introduced into the compression chamber.

27. The method of claim 23 including the step of advancing the opening of the outlet valve to maintain a desired compression ratio in the compression chamber when more air is taken into the compression chamber.

28. The method of claim 23 including the step of delaying the closing of the inlet valve to allow additional gas to pass from the combustion chamber to the expansion chamber.

29. The method of claim 23 including the step of delaying the opening of the exhaust valve to allow pressure in the expansion chamber to reach a level at or near atmospheric pressure before the exhaust valve opens.

\* \* \* \* \*